(12) United States Patent
Nishisaka et al.

(10) Patent No.: US 10,418,191 B2
(45) Date of Patent: *Sep. 17, 2019

(54) ELECTRONIC COMPONENT WITH OUTER ELECTRODE INCLUDING SINTERED LAYERS, GLASS LAYER, AND METAL LAYERS AND METHOD FOR PRODUCING THE SAME

(71) Applicant: Murata Manufacturing Co., Ltd., Nagaokakyo-shi, Kyoto-fu (JP)

(72) Inventors: Yasuhiro Nishisaka, Nagaokakyo (JP); Tomoe Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,119

(22) Filed: Mar. 4, 2016

(65) Prior Publication Data
US 2016/0276104 A1    Sep. 22, 2016

(30) Foreign Application Priority Data

Mar. 20, 2015  (JP) ................. 2015-057896

(51) Int. Cl.
*H01G 13/00* (2013.01)
*H01G 4/232* (2006.01)
*H01G 4/12* (2006.01)

(52) U.S. Cl.
CPC .......... *H01G 13/006* (2013.01); *H01G 4/232* (2013.01); *H01G 4/2325* (2013.01); *H01G 4/12* (2013.01)

(58) Field of Classification Search
CPC ........ H01G 4/232; H01G 4/2325; H01G 4/12; H01G 13/006
See application file for complete search history.

(56) References Cited

U.S. PATENT DOCUMENTS

| 4,634,634 A | * | 1/1987 | Kondo | ............. C03C 8/02 428/428 |
| 6,903,920 B1 | * | 6/2005 | Prymak | ............. H01G 2/065 361/306.1 |
| 9,653,211 B2 | * | 5/2017 | Kisumi | ............. H01B 1/22 |
| 2004/0240146 A1 | * | 12/2004 | Kayatani | ............. H01G 2/103 361/306.3 |

(Continued)

FOREIGN PATENT DOCUMENTS

| JP | 06244051 A | * | 9/1994 | ......... H01G 4/30 |
| JP | 08-330174 A |  | 12/1996 | |

(Continued)

OTHER PUBLICATIONS

Official Communication issued in a corresponding Korean Patent Application No. 10-2016-0032541, dated Apr. 13, 2017.

(Continued)

*Primary Examiner* — David M Sinclair
(74) *Attorney, Agent, or Firm* — Keating & Bennett, LLP

(57) ABSTRACT

An outer electrode includes sintered layers each containing a sintered metal, an electrically insulating glass layer, and metal layers each containing at least one of Sn and Cu. Each sintered layer covers a respective end surface of a body and extends from the end surface to at least one main surface of the body. The glass layer is directly provided on the sintered layers located on the end surfaces of the body, extends in a direction perpendicular or substantially perpendicular to side surfaces of the body, and defines a portion of a surface of the outer electrode. Each metal layer covers a portion of one of the sintered layers other than a portion of the corresponding sintered layer that is covered with the glass layer, and defines another portion of the surface of the outer electrode.

18 Claims, 11 Drawing Sheets

(56) References Cited

U.S. PATENT DOCUMENTS

| | | | | |
|---|---|---|---|---|
| 2006/0180899 A1* | 8/2006 | Ko | ............... | H01C 1/028 257/634 |
| 2008/0081200 A1 | 4/2008 | Katsube et al. | | |
| 2012/0154977 A1* | 6/2012 | Hur | ............... | H01B 1/16 361/303 |
| 2012/0313489 A1* | 12/2012 | Shirakawa | ............... | H01G 4/30 310/365 |
| 2013/0208398 A1* | 8/2013 | Tanaka | ............... | H01G 4/306 361/301.4 |
| 2014/0041930 A1 | 2/2014 | Yanagida et al. | | |
| 2014/0116766 A1* | 5/2014 | Jeon | ............... | H05K 3/3442 174/260 |
| 2014/0124251 A1* | 5/2014 | Park | ............... | H05K 3/3442 174/257 |
| 2015/0043125 A1* | 2/2015 | Park | ............... | H01G 4/12 361/301.4 |
| 2015/0364253 A1* | 12/2015 | Arnold | ............... | H01G 2/065 174/260 |

FOREIGN PATENT DOCUMENTS

| | | | |
|---|---|---|---|
| JP | 11251177 A * | 9/1999 | |
| JP | 2000-286142 A | 10/2000 | |
| JP | 2002-359104 A | 12/2002 | |
| JP | 2003-022929 A | 1/2003 | |
| JP | 2003151805 A * | 5/2003 | |
| JP | 2010245095 A * | 10/2010 | |
| JP | 2012134286 A * | 7/2012 | |
| JP | 2014-053598 A | 3/2014 | |
| JP | 2014-086718 A | 5/2014 | |
| JP | 2015-037187 A | 2/2015 | |
| KR | 10-2008-0010452 A | 1/2008 | |

OTHER PUBLICATIONS

Mori et al., "Electronic Component and Method for Manufacturing the Same,", U.S. Appl. No. 14/487,121, filed Sep. 16, 2014.

Mori et al., "Electronic Component and Method for Manufacturing the Same", U.S. Appl. No. 15/728,571, filed Oct. 10, 2017.

Official Communication issued in corresponding Japanese Patent Application No. 2015-057896, dated Feb. 12, 2019.

Official Communication issued in Japanese Patent Application No. 2015-057896, dated Oct. 9, 2018.

* cited by examiner

ELECTRONIC COMPONENT WITH OUTER ELECTRODE INCLUDING SINTERED LAYERS, GLASS LAYER, AND METAL LAYERS AND METHOD FOR PRODUCING THE SAME

BACKGROUND OF THE INVENTION

1. Field of the Invention

The present invention relates to an electronic component and a method for producing the electronic component, and in particular, to an electronic component mounted by solder and a method for producing the electronic component.

2. Description of the Related Art

Japanese Unexamined Patent Application Publication No. 2003-22929 discloses a multilayer ceramic capacitor that inhibits a short circuit between inner electrodes caused by a crack due to thermal contraction of a solder fillet.

In the multilayer ceramic capacitor disclosed in Japanese Unexamined Patent Application Publication No. 2003-22929, when a crack is formed due to tension of a solder fillet in a portion of a body in the vicinity of one outer electrode, inner electrodes connected to the other outer electrode are not exposed at the crack. This inhibits the occurrence of a short circuit between the inner electrodes when water penetrates into the crack.

In the case where a crack is formed in a body by a tensile stress due to the thermal contraction of a solder fillet to break an inner electrode, the electrostatic capacitance of a multilayer ceramic capacitor is reduced. Like this, in the case where a crack is formed in an electronic component by a tensile stress due to the thermal contraction of a solder fillet, the electrical characteristics of the electronic component are degraded.

SUMMARY OF THE INVENTION

Preferred embodiments of the present invention provide an electronic component that inhibits formation of a crack in a body caused by a tensile stress due to thermal contraction of a solder fillet, and a method for producing the electronic component.

According to a preferred embodiment of the present invention, an electronic component includes a body in which inner electrodes are provided, the body including a pair of main surfaces, a pair of side surfaces connecting the main surfaces together, and a pair of end surfaces perpendicular or substantially perpendicular to the pair of main surfaces and the pair of side surfaces; and an outer electrode provided on a surface of the body, the outer electrode being electrically connected to the inner electrodes. The outer electrode includes sintered layers each containing a sintered metal, a glass layer composed of a material with electrical insulating properties, and metal layers each containing at least one of Sn and Cu. Each of the sintered layers covers a corresponding one of the end surfaces and extends from the corresponding end surface to at least one of the main surfaces. The glass layer is directly provided on the sintered layers located on the end surfaces and extends in a direction perpendicular or substantially perpendicular to the side surfaces, the glass layer defining a portion of a surface of the outer electrode. Each of the metal layers covers a portion of a corresponding one of the sintered layers other than a portion of the corresponding sintered layer that is covered with the glass layer, each of the metal layers defining another portion of the surface of the outer electrode.

According to a preferred embodiment of the present invention, preferably, each of the metal layers extends from each of the end surface side to one main surface side of the pair of the main surfaces.

According to a preferred embodiment of the present invention, preferably, none of the inner electrodes are located in any of virtual planes each connected along a shortest length between the position of an edge portion of the glass layer located on the end surface side, the edge portion of the glass layer being adjacent to the corresponding main surface, and the position of the edge portion of the outer electrode located on the corresponding main surface.

According to a preferred embodiment of the present invention, preferably, the glass layer is directly provided on portions of the sintered layers located on the end surfaces in such a manner that at least a portion of the glass layer is located between the corresponding main surface and the position of an edge portion of one of the inner electrodes, the position being closest to the corresponding main surface in a direction perpendicular or substantially perpendicular to the main surfaces.

According to a preferred embodiment of the present invention, preferably, each of the sintered layers further extends from a corresponding one of the end surfaces to the side surfaces. Preferably, the glass layer is further provided directly on portions of the sintered layers on the side surfaces and extends in a direction perpendicular or substantially perpendicular to the end surfaces.

According to a preferred embodiment of the present invention, preferably, the outer electrode further includes reinforcement layers containing Ni or Cu. Preferably, each of the reinforcement layers is provided between a corresponding one of the sintered layers and a corresponding one of the metal layers.

According to a preferred embodiment of the present invention, preferably, the outer electrode further includes underlying layers composed of a material including Cu or Ni different from a material of the reinforcement layers. Preferably, each of the underlying layers is provided between a corresponding one of the sintered layers and a corresponding one of the reinforcement layers.

According to a preferred embodiment of the present invention, a method for producing an electronic component, including a step of preparing a body in which inner electrodes are provided, the body including a pair of main surfaces, a pair of side surfaces connecting the main surfaces together, and a pair of end surfaces perpendicular or substantially perpendicular to the pair of main surfaces and the pair of side surfaces; and a step of providing an outer electrode on a surface of the body in such a manner that the outer electrode is electrically connected to the inner electrodes. The step of providing the outer electrode includes a substep of providing sintered layers each containing a sintered metal, a substep of providing a glass layer composed of a material with electrical insulating properties, and a substep of providing metal layers each containing at least one of Sn and Cu. In the substep of providing the sintered layers, each of the sintered layers is provided so as to cover a corresponding one of the end surfaces and extend from the corresponding end surface to at least one of the main surfaces. In the substep of providing the glass layer, the glass layer is directly provided on the sintered layers located on the end surfaces so as to extend in a direction perpendicular or substantially perpendicular to the side surfaces and to define a portion of a surface of the outer electrode. In the substep of providing the metal layers, each of the metal layers is provided so as to cover a portion of a corresponding one of the sintered layers other than a portion of the corresponding sintered layer that is covered with the glass layer and so as to define another portion of the surface of the outer electrode.

According to a preferred embodiment of the present invention, preferably, in the substep of providing the metal layers, each of the metal layers is provided so as to extend from each of the end surface side to one main surface side of the pair of the main surfaces.

According to a preferred embodiment of the present invention, preferably, in the step of providing the outer electrode, the outer electrode is provided in such a manner that none of the inner electrodes are located in any of virtual planes each connected along a shortest length between the position of an edge portion of the glass layer located on the end surface side, the edge portion of the glass layer being adjacent to the corresponding main surface, and the position of the edge portion of the outer electrode located on the corresponding main surface.

According to a preferred embodiment of the present invention, preferably, in the substep of providing the glass layer, the glass layer is directly provided on portions of the sintered layers located on the end surfaces in such a manner that at least a portion of the glass layer is located between the corresponding main surface and the position of an edge portion of one of the inner electrodes, the position being closest to the corresponding main surface in a direction perpendicular or substantially perpendicular to the main surfaces.

According to a preferred embodiment of the present invention, preferably, in the substep of providing the sintered layers, each of the sintered layers is provided so as to further extend from a corresponding one of the end surfaces to the side surfaces. Preferably, in the substep of providing the glass layer, the glass layer is further provided directly on portions of the sintered layers on the side surfaces so as to extend in a direction perpendicular or substantially perpendicular to the end surfaces.

According to a preferred embodiment of the present invention, preferably, the step of providing the outer electrode further includes a substep of providing reinforcement layers containing Ni or Cu. Preferably, in the substep of providing the reinforcement layers, each of the reinforcement layers is provided between a corresponding one of the sintered layers and a corresponding one of the metal layers.

According to a preferred embodiment of the present invention, preferably, the step of providing the outer electrode further includes a substep of providing underlying layers composed of a material including Cu or Ni different from a material of the reinforcement layers. Preferably, in the substep of providing the underlying layers, each of the underlying layers is provided between a corresponding one of the sintered layers and a corresponding one of the reinforcement layers.

According to a preferred embodiment of the present invention, preferably, in the substep of providing the sintered layers, dielectric layers contained in the body is co-fired with the sintered layers.

According to various preferred embodiments of the present invention, it is possible to prevent formation of a crack in the body caused by a tensile stress due to thermal contraction of a solder fillet.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
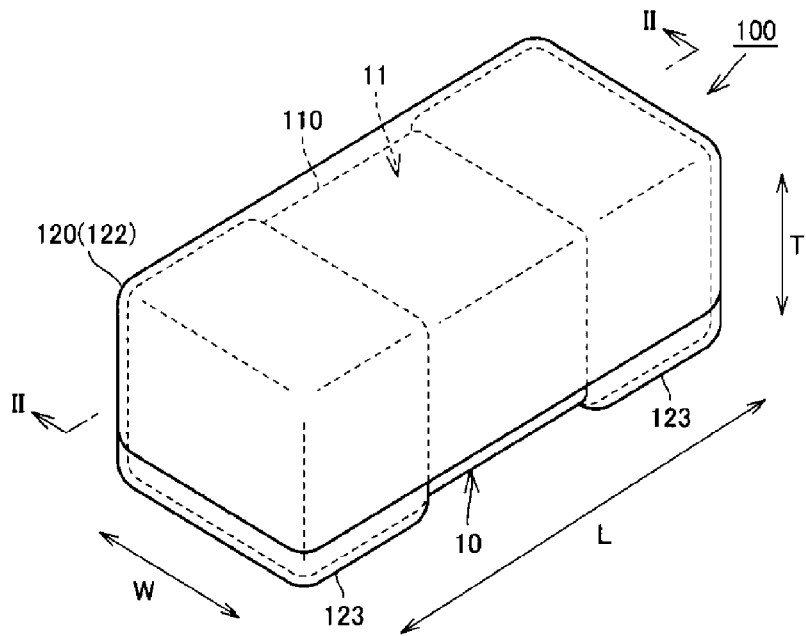
FIG. 1 is a perspective view illustrating the external appearance of an electronic component according to a first preferred embodiment of the present invention.

An electronic component according to a first preferred embodiment of the present invention will be described below with reference to the attached drawings. In the description of the following preferred embodiments, the same or equivalent elements in the drawings are designated using the same reference numerals, and redundant description is not repeated. In the following description, a multilayer ceramic capacitor will be described as an electronic component. However, the electronic component is not limited to the capacitor and may be a piezoelectric component, a thermistor, an inductor, or the like.

First Preferred Embodiment

Figure 2:
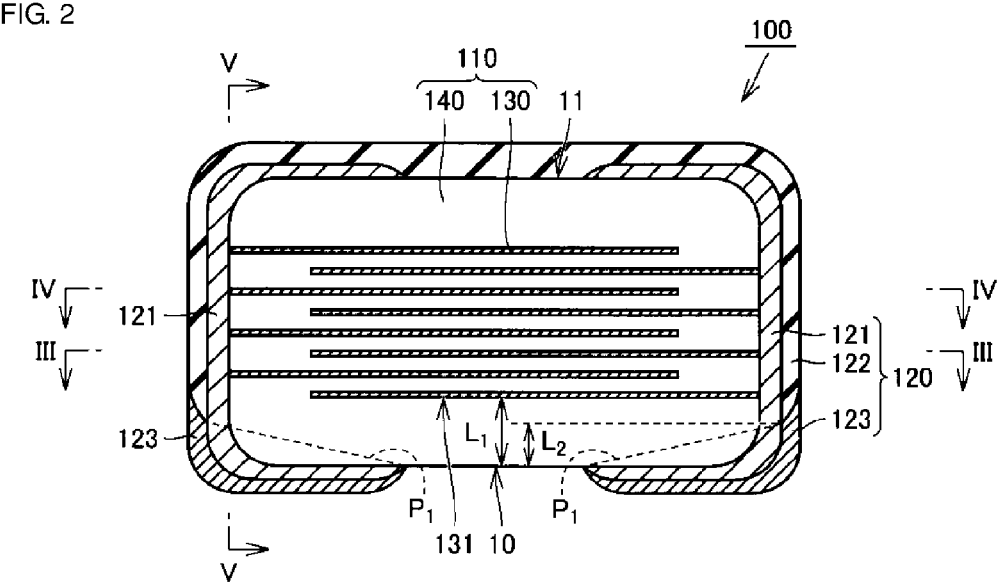
FIG. 2 is a cross-sectional view of the electronic component illustrated in FIG. 1, the view being taken along line II-II of FIG. 1, and the electric component being viewed in the direction of the arrows.
Figure 3:
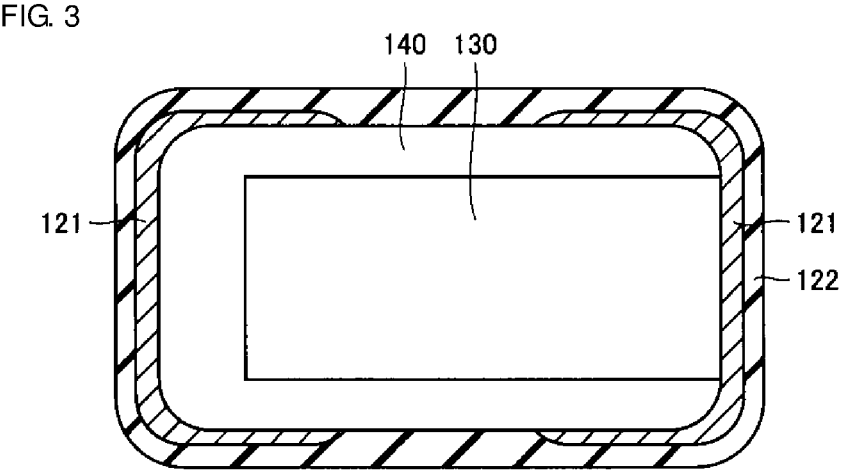
FIG. 3 is a cross-sectional view of the electronic component illustrated in FIG. 2, the view being taken along line III-III of FIG. 2, and the electronic component being viewed in the direction of the arrows.
Figure 4:
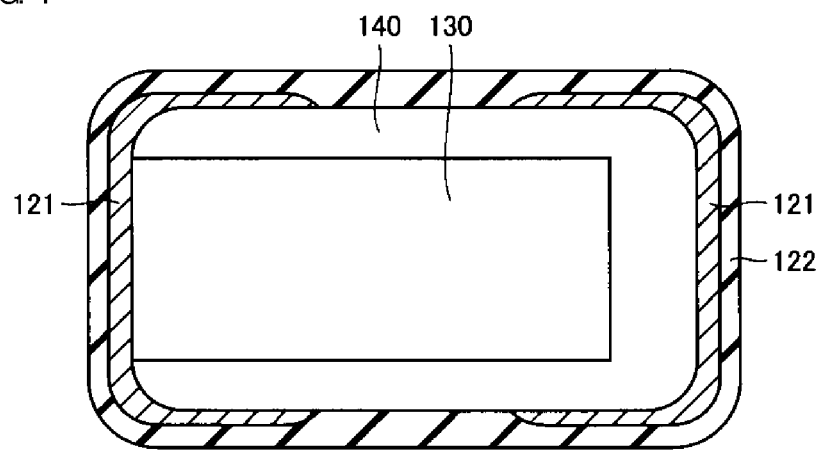
FIG. 4 is a cross-sectional view of the electronic component illustrated in FIG. 2, the view being taken along line IV-IV of FIG. 2, and the electronic component being viewed in the direction of the arrows.
Figure 5:
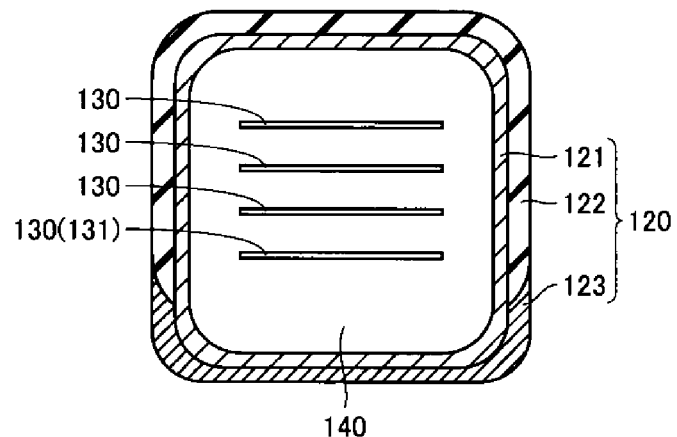
FIG. 5 is a cross-sectional view of the electronic component illustrated in FIG. 2, the view being taken along line V-V of FIG. 2, and the electronic component being viewed in the direction of the arrows.

FIG. 1 is a perspective view illustrating the external appearance of an electronic component according to a first preferred embodiment of the present invention. FIG. 2 is a cross-sectional view of the electronic component illustrated in FIG. 1, the view being taken along line II-II of FIG. 1, and the electric component being viewed in the direction of the arrows. FIG. 3 is a cross-sectional view of the electronic component illustrated in FIG. 2, the view being taken along line III-III of FIG. 2, and the electronic component being viewed in the direction of the arrows. FIG. 4 is a cross-sectional view of the electronic component illustrated in FIG. 2, the view being taken along line IV-IV of FIG. 2, and the electronic component being viewed in the direction of the arrows. FIG. 5 is a cross-sectional view of the electronic component illustrated in FIG. 2, the view being taken along line V-V of FIG. 2, and the electronic component being viewed in the direction of the arrows. In FIG. 1, L represents the longitudinal direction of a body described below. W represents the width direction of the body. T represents the thickness direction of the body.

As illustrated in FIGS. 1 to 5, an electronic component 100 according to the first preferred embodiment of the present invention includes a substantially rectangular parallelepiped body 110 in which inner electrodes 130 are provided, and an outer electrode 120 provided on surfaces of the body 110, the outer electrode 120 being electrically connected to the inner electrodes 130.

In the body 110, dielectric layers 140 and the inner electrodes 130 each having a substantially flat-plate shape are alternately laminated. The lamination direction of the dielectric layers 140 and the inner electrodes 130 is perpendicular or substantially perpendicular to the longitudinal direction L and the width direction W of the body 110. In other words, the lamination direction of the dielectric layers 140 and the inner electrodes 130 is parallel or substantially parallel to the thickness direction T of the body 110.

The body 110 includes a pair of main surfaces perpendicular or substantially perpendicular to the thickness direction T, a pair of end surfaces perpendicular or substantially perpendicular to the longitudinal direction L, and a pair of side surfaces perpendicular or substantially perpendicular to the width direction W. The pair of main surfaces includes one main surface 10 and the other main surface 11. The one main surface 10 is a surface located on the side of a mounting surface of the electronic component 100 at the time of mounting. That is, the one main surface 10 is a surface facing a substrate when the electronic component 100 is mounted on the substrate.

As described above, the body 110 includes the pair of main surfaces perpendicular or substantially perpendicular to the lamination direction of the dielectric layers 140 and the inner electrodes 130, the pair of side surfaces connecting the main surfaces together, and the pair of end surfaces perpendicular or substantially perpendicular to the pair of main surfaces and the pair of side surfaces.

Although the body 110 has a round-cornered substantially rectangular parallelepiped outer shape, the body 110 may not have rounded corners. Any one of the pair of main surfaces, the pair of end surfaces, and the pair of side surfaces may have irregularities.

In adjacent inner electrodes 130 facing each other, a first group of the inner electrodes 130 is electrically connected to the outer electrode 120 on the side of one of the end surfaces of the body 110. A second group of the inner electrodes 130 is electrically connected to the outer electrode 120 on the side of the other end surface of the body 110.

Details of these elements will be described below.

The dielectric layers 140 may be composed of a dielectric ceramic material containing, for example, $BaTiO_3$, $CaTiO_3$, $SrTiO_3$, or $CaZrO_3$ as a main component. The dielectric ceramic material may further contain, for example, a Mn compound, a Co compound, a Si compound, and/or a rare-earth compound as an auxiliary component.

Each of the inner electrodes 130 has a substantially rectangular outer shape in plan view. Adjacent inner electrodes 130 in the lamination direction face each other with the corresponding dielectric layer 140 provided therebetween. The inner electrodes 130 in the first group and the inner electrodes 130 in the second group are alternately arranged at regular intervals in the thickness direction T of the body 110.

The first group of the inner electrodes 130 extends from one of the end surfaces toward the other end surface of the body 110. As illustrated in FIG. 3, the first group of the inner electrodes 130 is connected to a sintered layer 121 (to be described below) of the outer electrode 120 on the side of the one end surface of the body 110.

The second group of the inner electrodes 130 extends from the other end surface toward the one end surface of the body 110. As illustrated in FIG. 4, the second group of the inner electrodes 130 is connected to a sintered layer 121 (to be described below) of the outer electrode 120 on the side of the other end surface of the body 110.

The inner electrodes 130 may be composed of a metal, for example, Ni, Cu, Ag, Pd, Au, Pt, or Sn, or an alloy, for example, a Ag—Pd alloy, containing at least one of the metals. In this preferred embodiment, the inner electrodes 130 preferably are composed of Ni, for example.

As illustrated in FIG. 2, the outer electrode 120 includes the sintered layers 121 containing a sintered metal, a glass layer 122 composed of a material with electrical insulating properties, and metal layers 123 containing at least one of Sn and Cu.

The sintered layers 121 are provided so as to cover the end surfaces of the body 110, each of the sintered layers 121 extending from a corresponding one of the end surfaces to at least the one main surface 10. In this preferred embodiment, one of the sintered layers 121 covers the whole of the one end surface of the body 110 and extends from the one end surface to the main surfaces and the side surfaces. The other sintered layer 121 covers the whole of the other end surface of the body 110 and extends from the other end surface to the main surfaces and the side surfaces. The sintered layer 121 extending from the one end surface to the main surfaces and the side surfaces of the body 110 and the sintered layer 121 extending from the other end surface to the main surfaces and the side surfaces of the body 110 are spaced apart from each other and are not electrically connected to each other.

The sintered layers 121 may be composed of a metal, for example, Ni, Cu, Ag, or Pd. The sintered layers 121 may be produced from a conductive paste mainly containing an alloy that contains at least one of the metals. In this preferred embodiment, a conductive paste mainly containing Cu is applied to the surfaces of the body 110 and heated to, for example, about 700° C. to form the sintered layers 121 baked on the body 110.

The sintered layers 121 contain a glass component. A surface portion of each of the sintered layers 121 has a higher glass content than that of the inner portion of the corresponding sintered layer 121. A higher glass content of the surface portion of each sintered layer 121 results in higher adhesion between the sintered layers 121 and the glass layer 122 described below to inhibit the detachment of the glass layer 122.

The glass layer 122 is directly provided on portions of the sintered layers 121 located on the end surfaces so as to extend in the width direction W perpendicular or substantially perpendicular to the side surfaces of the body 110 and define and function as a portion of a surface of the outer electrode 120.

In this preferred embodiment, on the side of each of the end surfaces of the body 110, the glass layer 122 extends across the whole of the body 110 in the width direction W. As illustrated in FIG. 2, none of the inner electrodes 130 are located in any of virtual planes $P_1$ each connecting between the position of an edge portion of the glass layer 122 located on the side of a corresponding one of the end surfaces of the body 110, the edge portion of the glass layer 122 being adjacent to the one main surface 10 of the body 110, and the position of a corresponding one of the edge portions of the outer electrode 120 located on the one main surface 10 of the body 110 in the shortest length.

In this preferred embodiment, as illustrated in FIG. 2, none of the inner electrodes 130 intersect with virtual lines included in the virtual planes $P_1$ in any section of the electronic component 100 parallel or substantially parallel to the side surfaces of the body 110. However, one or more of the inner electrodes 130 may intersect with the virtual lines. Preferably, none of the inner electrodes 130 intersect with any of the virtual lines.

The glass layer 122 is directly provided on portions of the sintered layers 121 located on the end surfaces of the body 110 in such a manner that at least a portion of the glass layer 122 is located between the one main surface 10 of the body 110 and the position of an edge portion of one of the inner electrodes 130, the position being closest to the one main surface 10 of the body 110 in the thickness direction T perpendicular or substantially perpendicular to the main surfaces of the body 110.

Specifically, the relationship $L_2<L_1$ is satisfied, where $L_1$ represents a length between the one main surface 10 of the body 110 and an edge portion of an inner electrode 131 closest to the one main surface 10, the edge portion being adjacent to the one main surface 10, and $L_2$ represents a length between the one main surface 10 of the body 110 and the position of an end portion of the glass layer 122 located on the side of each end surface of the body 110, the end portion being adjacent to the one main surface 10, and the length represented by $L_2$ being a length in the thickness direction T of the body 110.

In this preferred embodiment, $L_2>0$. That is, only a portion of each of the sintered layers 121 located on both the end surfaces of the body 110, the portion being adjacent to the one main surface 10, is not covered with the glass layer 122. The relationship $L_2>L_T/10$ is preferred because of a reason described below, where $L_T$ represents the thickness of the body 110. Thus, in the electronic component 100, both of the relationships $L_2<L_1$ and $L_2>L_T/10$ are preferably satisfied. In this preferred embodiment, the electronic component 100 satisfies the relationship $L_T/10<L_2<L_1$.

On the side of each of the side surfaces of the body 110, the glass layer 122 extends in the longitudinal direction L perpendicular or substantially perpendicular to the end surfaces of the body 110. In this preferred embodiment, on the side of each of the side surfaces of the body 110, the glass layer 122 extends across the whole of the body 110 in the longitudinal direction L. That is, portions of the glass layer 122 are directly provided on the sintered layers 121 located on the side surfaces of the body 110. Other portions of the glass layer 122 are directly provided on the side surfaces of the body 110.

Portions of the glass layer 122 located adjacent to the end surfaces of the body 110 and portions of the glass layer 122 located adjacent to the side surfaces of the body 110 are connected together to define a ring shape. On the side of each of the side surfaces of the body 110, the length between the one main surface 10 of the body 110 and the position of an end portion of the glass layer 122 adjacent to the one main surface 10 of the body 110, the length being a length in the thickness direction T of the body 110, is represented by $L_2$.

A portion of the glass layer 122 covers the whole area on the side of the other main surface 11 of the body 110. In other words, a portion of the glass layer 122 is directly provided on portions of the sintered layers 121 located on the other main surface 11 of the body 110. Another portion of the glass layer 122 is directly provided on the other main surface of the body 110. The portion of the glass layer 122 that covers the whole area on the side of the other main surface 11 of the body 110 is connected to portions of the glass layer 122 located adjacent to the end surfaces of the body 110 and portions of the glass layer 122 located adjacent to the side surfaces of the body 110.

As described above, the portions of the glass layer 122 are directly provided on the other main surface 11 of the body 110 and the side surfaces of the body 110. The glass layer 122 has higher adhesion to the body 110 than those of the sintered layers 121. Thus, the direct arrangement of the portions of the glass layer 122 on the body 110 inhibits the peeling of the glass layer 122 during plating treatment or mounting described below.

The glass layer 122 is preferably composed of a glass material having excellent resistance to a plating solution and a Si mole fraction of about 20% by mole or more and about 65% by mole or less, for example.

A tape peel test will now be described. Five types of multilayer bodies including glass layers arranged on sintered layers were subjected to the tape peel test, the glass layers being composed of glass materials with different Si mole fractions. In the tape peel test, each of the multilayer bodies was immersed in a sulfuric acid aqueous solution with a pH of about 2 and a temperature of about 60° C. for about 8 hours. Then a tape attached on the glass layer was peeled off.

The presence or absence of peeling of the glass layer was checked. Ten samples of each of the five types of multilayer bodies were subjected to the tape peel test to determine the incidence of peeling of the glass layers. The Table below lists the results.

TABLE

| Si mole fraction (% by mole) | 10 | 20 | 40 | 65 | 70 |
|---|---|---|---|---|---|
| Incidence of peeling of glass layer (%) | 60 | 0 | 0 | 0 | 20 |

As listed in the above Table, when the glass layers had Si mole fractions of about 10% by mole and about 70% by mole, the glass layers peeled off. When the glass layers had Si mole fractions of about 20% by mole, about 40% by mole, and about 65% by mole, the glass layers did not peel off.

In the case of the glass layer having a Si mole fraction less than about 20% by mole, the glass layer has insufficient resistance to the plating solution, so that the glass layer is liable to peel off. In the case of the glass layer having a Si mole fraction more than about 65% by mole, a glass material has a high glass softening point and low wettability on the sintered layers, so that the adhesive strength of the glass layer to the sintered layers is reduced. Thus, the glass layer is liable to peel off.

The metal layers 123 are provided on the sintered layers 121 so as to cover portions of the sintered layers 121 other than portions of the sintered layers 121 covered with the glass layer 122. The metal layers 123 define and function as other portions of the surfaces of the outer electrode 120.

In this preferred embodiment, each of the metal layers 123 extends from the side of a corresponding one of the end surfaces of the body 110 to the one main surface 10. As described above, only the portion of each of the sintered layers 121 on the end surfaces of the body 110, the portion being adjacent to the one main surface 10, is not covered with the glass layer 122. On the side of each of the end surfaces of the body 110, the metal layers 123 cover portions of the sintered layers 121 that are not covered with the glass layer 122, the portions being adjacent to the one main surface 10.

The metal layers 123 cover portions of the sintered layers 121 that are not covered with the glass layer 122, the portions being located on the one main surface 10 of the body 110. The metal layers 123 also cover portions of the sintered layers 121 located on the side surface of the body 110, the portions of the sintered layers 121 being not covered with the glass layer 122 and being located adjacent to the one main surface 10.

As described above, one of the sintered layers 121 extends from one of the end surfaces to the main surfaces and the side surfaces of the body 110. The other sintered layer 121 extends from the other end surface to the main surfaces and the side surfaces of the body 110.

Thus, one of the metal layers 123 extends from the side of one of the end surfaces to the side of the one main surface 10 and the side-surface sides of the body 110. The other metal layer 123 extends from the side of the other end surface to the side of the one main surface 10 and the side-surface sides of the body 110.

The one metal layer 123 that extends from the side of one of the end surfaces of the body 110 to the side of the one main surface 10 and the side-surface sides of the body 110 is spaced apart from the other metal layer 123 that extends from the side of the other end surface of the body 110 to the side of the one main surface 10 and the side-surface sides of the body 110, and these metal layers 123 are not electrically connected to each other.

The metal layers 123 may be composed of a metal material having good solder wettability and containing at least one of Sn and Cu. Specifically, the metal layers 123 may be composed of Sn, a Sn alloy, Cu, or a Cu alloy. In this preferred embodiment, the metal layers 123 are composed of Sn.

The use of the metal layers 123 composed of Cu allows the outer electrode 120 of the multilayer ceramic capacitor to have resistance to laser light. Since the outer electrode 120 has resistance to laser light, a substrate including a multilayer ceramic capacitor therein can be irradiated with laser light to form via holes that reach the outer electrode 120. Cu films can be formed in the via-holes by electroless plating to electrically connect the outer electrode 120 to a conductive pattern on a surface of the substrate.

Figure 6:
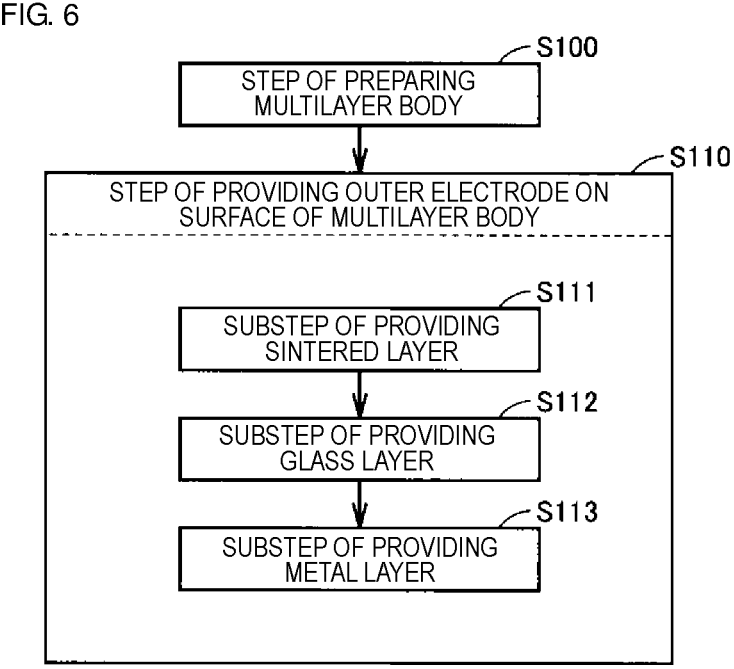
FIG. 6 is a flow chart of a method for producing the electronic component according to the preferred embodiment.

A non-limiting example of a method for producing an electronic component according to a preferred embodiment of the present invention will be described below. FIG. 6 is a flow chart of a method for producing the electronic component according to this preferred embodiment. As illustrated in FIG. 6, the method includes a step (S100) of preparing the body 110 and a step (S110) of providing the outer electrode 120 on surfaces of the body 110 in such a manner that the outer electrode 120 is electrically connected to the inner electrodes 130.

The body 110 is produced preferably according to the following steps. A ceramic paste containing a ceramic powder is formed into sheets by application using, for example, a die coating method, a gravure coating method, or a micro-gravure coating method. The resulting sheets are dried to form ceramic green sheets.

A conductive paste for the formation of an inner electrode is applied to some of the resulting ceramic green sheets by, for example, a screen printing method, an inkjet printing method, or a gravure printing method so as to form a predetermined pattern. In this way, the ceramic green sheets each having the conductive pattern to be formed into the inner electrode and the ceramic green sheets that have no conductive pattern are prepared. Each of the ceramic paste and the conductive paste for the formation of an inner electrode may contain a known binder and a known solvent.

A predetermined number of the ceramic green sheets that have no conductive pattern are laminated. The plural ceramic green sheets each having the conductive pattern are sequentially laminated thereon. A predetermined number of the ceramic green sheets that have no conductive pattern are laminated thereon. Thus, a mother block is produced. The mother block may be pressed in the lamination direction with a device, such as an isostatic press, as needed.

The mother block is cut into a predetermined shape, thus producing a plurality of soft bodies having a substantially rectangular parallelepiped shape. The soft bodies having a substantially rectangular parallelepiped shape are subjected to barrel polishing to round the corners of the soft bodies. However, the barrel polishing may not necessarily be performed.

Each of the soft bodies is hardened by firing to produce the body 110. The firing temperature is appropriately set, depending on the types of ceramic material and conductive material. For example, the firing temperature is set in the range of about 900° C. or higher and about 1300° C. or lower.

The step (S110) of providing the outer electrode 120 includes a substep (S111) of providing the sintered layers 121 containing a sintered metal, a substep (S112) of providing the glass layer 122 composed of a material having electrical insulating properties, and a substep (S113) of providing the metal layers 123 containing at least one of Sn and Cu.

In the substep (S111) of providing the sintered layers 121, the sintered layers 121 are provided so as to cover the end surfaces of the body 110 and extend from the end surfaces of the body 110 to at least the one main surface of the body 110. In this preferred embodiment, a conductive paste used for the formation of the sintered layers 121 is applied to both end-surface portions of the body 110 by a dipping method. In this way, in the substep (S111) of providing the sintered layers 121, the sintered layers 121 are provided so as to extend from the end surfaces of the body 110 to the main surfaces and the side surfaces of the body 110.

As described above, in this preferred embodiment, the conductive paste mainly containing Cu is applied to surfaces of the body 110 and heated to, for example, about 700° C. to form the sintered layers 121 baked on the body 110.

The sintered layers 121 each including a plurality of sublayers may be formed by repeating the application and drying of a conductive paste. In this case, the glass content of a conductive paste applied first is preferably lower than that of a conductive paste applied later in order that the outermost sublayer of each of the sintered layers 121 may have a high glass content. This enhances the adhesion of the sintered layers 121 to the glass layer 122 formed later, thus inhibiting the peeling of the glass layer 122 during plating treatment or amounting described below.

In the substep (S111) of providing the sintered layers, the dielectric layers 140 may be co-fired with the sintered layers 121. Specifically, the conductive paste is applied to the soft body and then fired, thus simultaneously forming the body 110 and the sintered layers 121.

In the substep (S112) of providing the glass layer 122, the glass layer 122 is directly provided on portions of the sintered layers 121 located on the end surfaces of the body 110 so as to extend in the width direction W perpendicular or substantially perpendicular to the side surfaces of the body 110 and define and function as a portion of surfaces of the outer electrode 120.

In this preferred embodiment, the glass layer 122 is provided by a method described below. For example, a varnish and a solvent are mixed with a glass powder having a particle diameter (D50) of about 1 µm or more and about 3 µm or less to prepare a glass paste. The volume fraction of a glass material in the glass paste is, for example, about 20% by volume. The glass paste is applied to a stage with a squeegee having a thickness of, for example, about 30 µm to form a film. A portion of the body 110 on the side of the other main surface 11 of the body 110 including the sintered layers 121 is dipped in the film, so that the glass paste is attached to end-surface portions, side-surface portions, and a portion of the body 110 on the side of the other main surface 11. The glass paste attached to the body 110 is dried at, for example, about 150° C. and then baked by heating at about 650° C. with a belt furnace to form the glass layer 122.

In the substep (S113) of providing the metal layers 123, the metal layers 123 are provided so as to cover portions of the sintered layers 121 other than portions of the sintered layers 121 that are covered with the glass layer 122 and so as to define and function as other portions of the surfaces of the outer electrode 120.

In this preferred embodiment, the metal layers 123 are provided by electroplating. Specifically, the metal layers 123 are provided by a barrel plating method. A barrel containing a plurality of the bodies 110 each including the sintered layers 121 and the glass layer 122 is energized while being immersed in a plating solution in a plating tank and being rotated, so that the metal layers 123 are provided on the portions of the sintered layers 121 other than the portions of the sintered layers 121 that are covered with the glass layer 122.

As described above, only a portion of each of the sintered layers 121 on the end surfaces of the body 110, the portion being adjacent to the one main surface 10, is not covered with the glass layer 122. On the side of each of the end surfaces of the body 110, the metal layers 123 cover portions of the sintered layers 121 that are not covered with the glass layer 122, the portions being adjacent to the one main surface 10. Furthermore, the metal layers 123 cover portions of the sintered layers 121 that are not covered with the glass layer 122, the portions being located on the one main surface 10 of the body 110. That is, each of the metal layers 123 extends from the side of a corresponding one of the end surfaces of the body 110 to the side of the one main surface 10.

On the side of each of the side surfaces of the body 110, the metal layers 123 cover portions of the sintered layers 121 that are not covered with the glass layer 122, the portions being adjacent to the one main surface 10. That is, one of the metal layers 123 extends from the side of one of the end surfaces of the body 110 to the side of the one main surface 10 and the side-surface sides of the body 110. The other metal layer 123 extends from the side of the other end surface of the body 110 to the side of the one main surface 10 and the side-surface sides of the body 110.

The electronic component 100 produced as described above is mounted by soldering. Sn—Sb-based solder, Sn—Cu-based solder, or Sn—Ag-based solder may be used.

Figure 7:
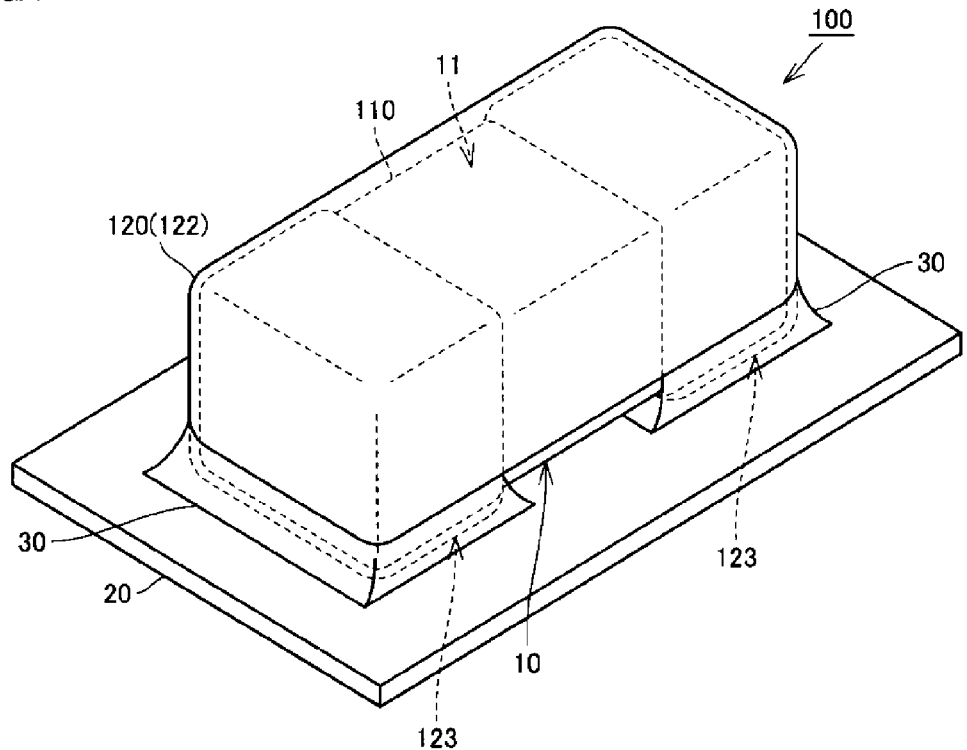
FIG. 7 is a perspective view illustrating a state in which the electronic component according to a preferred embodiment of the present invention is mounted on a substrate by soldering.

FIG. 7 is a perspective view illustrating a state in which the electronic component according to this preferred embodiment is mounted on a substrate by soldering. As illustrated in FIG. 7, the electronic component 100 is provided on a substrate 20 in such a manner that a solder paste pattern on the substrate 20 is in contact with the metal layers 123 of the outer electrode 120, and subjected to reflowing to form solder fillets 30, thus mounting the electronic component 100 on the substrate 20.

In the electronic component 100 according to this preferred embodiment, the glass layer 122 is provided on the surfaces of the outer electrode 120. Thus, the solder fillets 30 cannot wet or spread over the glass layer 122 and are formed only on portions of surfaces of the outer electrode 120 where the metal layers 123 that are not covered with the glass layer 122 are located.

That is, the glass layer 122 is provided so as to extend across the whole of the body 110 in the width direction W on the side of each of the end surfaces of the body 110 and extend across the whole of the body 110 in the longitudinal direction L on the side of each side surface of the body 110. Thus, the wetting and spreading of the solder fillets 30 are inhibited over the entire perimeter of the body 110.

In the outer electrode 120 of the electronic component 100 according to this preferred embodiment, the glass layer 122 is directly provided on the sintered layers 121 as described above. Thus, when the solder paste and the metal layers 123 coalesce during the reflowing, the glass layer 122 does not peel off, thus effectively inhibiting the wetting and spreading of the solder fillets 30.

If the glass layer 122 is provided on the metal layers 123, when the solder paste and the metal layers 123 coalesce during the reflowing, the glass layer 122 located on the molten metal layers 123 peels off. As a result, the solder fillets wet and spread over portions of the metal layers 123 exposed by the peeling of the glass layer 122, thus failing to effectively inhibit the wetting and spreading of the solder fillets.

In the electronic component 100 according to this preferred embodiment, the glass layer 122 is provided at least on the side of each of the end surfaces of the body 110, thus inhibiting the wetting and spreading of the solder fillets 30 and inhibiting the formation of a crack in the body 110, the crack being caused by a tensile stress due to the thermal contraction of the solder fillets 30.

As described above, none of the inner electrodes 130 are located in any of the virtual planes $P_1$ each connected between the position of the edge portion of the glass layer 122 located on the side of the corresponding end surface of the body 110, the edge portion of the glass layer 122 being adjacent to the one main surface 10 of the body 110, and the position of the corresponding edge portion of the outer electrode 120 located on the one main surface 10 of the body 110 in the shortest length. If a crack is formed by a tensile stress due to the thermal contraction of the solder fillets 30, the crack is likely to propagate along one of the virtual planes $P_1$. None of the inner electrodes 130 are located in any of the virtual planes $P_1$, so that the breaking of any of the inner electrodes 130 caused by crack formation is inhibited. This inhibits degradation in the electrical characteristics of the electronic component 100 due to the crack formation.

As described above, the relationship $L_T/10<L_2<L_1$ is satisfied, where $L_1$ represents the length between the one main surface 10 of the body 110 and the edge portion of the inner electrode 131 located on the side of the one main surface 10, $L_2$ represents a length between the one main surface 10 of the body 110 and the position of the end portion of the glass layer 122 located on the side of each end surface of the body 110, the end portion being adjacent to the one main surface 10, and the length represented by $L_2$ being a length in the thickness direction T of the body 110, and $L_T$ represents the thickness of the body 110.

In the case where the relationship $L_T/10<L_2$ is satisfied, the solder fillets 30 are appropriately formed to achieve high attitude stability of the electronic component 100 at the time of mounting. Furthermore, detachment of the mounted electronic component 100 from the substrate 20 due to, for example, impact is prevented.

The glass layer 122 preferably covers the sintered layers 121 so as to define and function as the outermost layer on the side of each of the side surfaces of the body 110. In this case, when a plurality of the electronic components 100 are mounted in close proximity, even in the case where the side surfaces of adjacent electronic components 100 having insufficient attitude stability are in contact with each other and where the electronic components 100 are mounted with the glass layers 122 in contact with each other, it is possible to prevent the electronic components 100 in contact with each other from being electrically short-circuited.

In the case where the relationship $L_2<L_1$ is satisfied, each of the solder fillets 30 does not overlap with a functional region defined as a region where the inner electrodes 130 are laminated in the body 110. Thus, the tensile stress due to the thermal contraction of the solder fillets 30 is less likely to affect the functional region. As a result, it is possible to inhibit the formation of a crack in the functional region due to the thermal contraction of the solder fillets 30.

In the case where the relationship $L_2<L_1$ is satisfied, the generation of what is called acoustic noise is inhibited. The reason for this will be described below.

In the case where the body 110 is composed of a material having piezoelectricity or electrostrictive characteristics, when a direct-current voltage on which an alternating-current voltage or alternating-current component is superposed is applied to the electronic component 100, the vibration of the electronic component 100 is attributed to mechanical strain. When the vibration attributed to the strain propagates to the substrate 20, a sound is emitted from the substrate 20. A sound having a frequency of 20 Hz or higher and kHz or lower is defined as an audible sound and causes an uncomfortable feeling in a person. This phenomenon is what is called acoustic noise.

In the electronic component 100, the functional region acts as a source of the vibration attributed to the mechanical strain. The vibration attributed to the mechanical strain generated in the functional region propagates from the outer electrode 120 to the substrate 20 through the solder fillets.

In the case where the relationship $L_2<L_1$ is satisfied, each of the solder fillets 30 does not overlap with the functional region. It is thus possible to reduce the vibration propagating from the functional region to the substrate 20 through the solder fillets 30. As a result, the sound generated from the substrate 20, i.e., acoustic noise, is reduced. In particular, this method is significantly effective for electronic components, such as a multilayer ceramic capacitor including the body 110 having the dielectric layers 140 composed of a dielectric with a relative dielectric constant $\varepsilon_r$ of about 3000 or more and a multilayer ceramic capacitor with a nominal electrostatic capacitance of about 10 μF or more, that are liable to cause the generation of acoustic noise.

An electronic component according to a second preferred embodiment of the present invention and a method for producing the electronic component will be described below. An electronic component 100a according to the second preferred embodiment differs from the electronic component 100 according to the first preferred embodiment only in that the electronic component 100a includes reinforcement layers. Thus, descriptions of other elements are not redundantly repeated.

Second Preferred Embodiment

Figure 8:
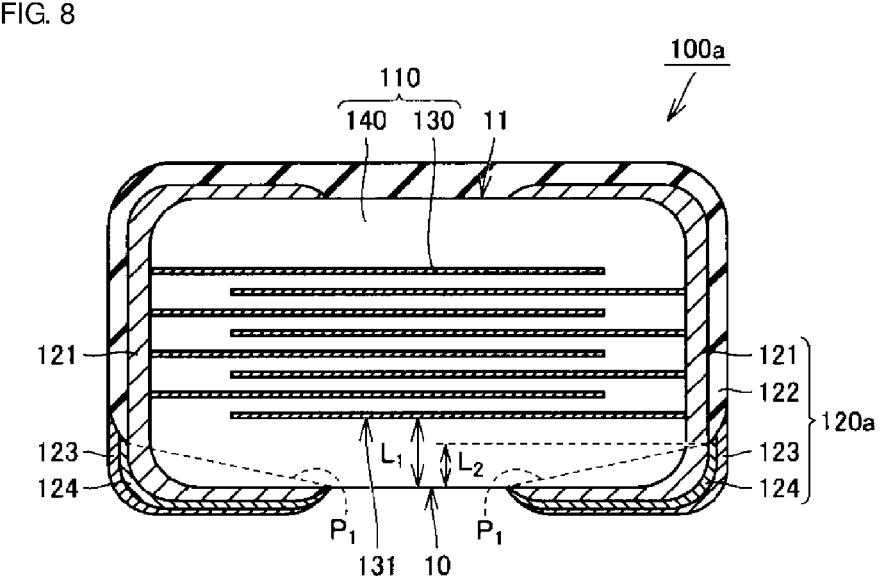
FIG. 8 is a cross-sectional view illustrating the structure of an electronic component according to a second preferred embodiment of the present invention.
Figure 9:
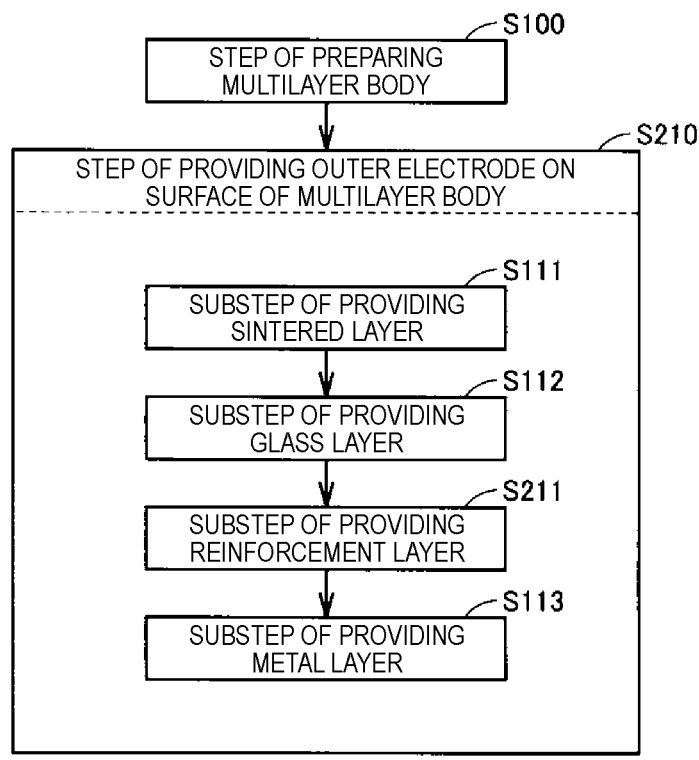
FIG. 9 is a flow chart of a method for producing the electronic component according to the second preferred embodiment of the present invention.

FIG. 8 is a cross-sectional view illustrating the structure of an electronic component according to the second preferred embodiment of the present invention. FIG. 9 is a flow chart of the method for producing the electronic component according to the second preferred embodiment of the present invention. FIG. 8 illustrates a cross section of the electronic component viewed from the same direction as in FIG. 2.

As illustrated in FIG. 8, in the electronic component 100a according to the second preferred embodiment of the present invention, an outer electrode 120a further includes reinforcement layers 124 containing Ni or Cu. Each of the reinforcement layers 124 is provided between a corresponding one of the sintered layers 121 and a corresponding one of the metal layers 123.

The reinforcement layers 124 are provided on the sintered layers 121 so as to cover portions of the sintered layers 121 other than portions of the sintered layers 121 that are covered with the glass layer 122. In this preferred embodiment, each of the reinforcement layers 124 extends from the side of a corresponding one of the end surfaces of the body 110 to the side of the one main surface 10. As described above, only the portion of each of the sintered layers 121 on the end surfaces of the body 110, the portion being adjacent to the one main surface 10, is not covered with the glass layer 122. On the side of each of the end surfaces of the body 110, the reinforcement layers 124 cover portions of the sintered layers 121 that are not covered with the glass layer 122, the portions being adjacent to the one main surface 10.

The reinforcement layers 124 cover portions of the sintered layers 121 that are not covered with the glass layer 122, the portions being located on the one main surface 10 of the body 110. The reinforcement layers 124 cover portions of the sintered layers 121 located on the side surface of the body 110, the portions of the sintered layers 121 being not covered with the glass layer 122 and being located adjacent to the one main surface 10.

As described above, one of the sintered layers 121 extends from one of the end surfaces of the body 110 to the main surfaces and the side surfaces of the body 110. The other sintered layer 121 extends from the other end surface of the body 110 to the main surfaces and the side surfaces of the body 110.

Thus, one of the reinforcement layers 124 extends from the side of one of the end surfaces of the body 110 to the side of the one main surface 10 and the side-surface sides of the body 110. The other reinforcement layer 124 extends from the side of the other end surface of the body 110 to the side of the one main surface 10 and the side-surface sides of the body 110.

The reinforcement layers 124 may be composed of Ni, a Ni alloy, Cu, or a Cu alloy. In this preferred embodiment, the reinforcement layers 124 are preferably composed of Ni, for example.

End portions of the glass layer 122 may be overlaid with the reinforcement layers 124 by about several micrometers. In this case, the glass layer 122 preferably has higher surface roughness. In a portion of each of the reinforcement layers 124 with which the end portions of the glass layer 122 are overlaid, the length of the portion of each of the reinforcement layers 124 in the thickness direction T of the body 110 is preferably larger than the thickness of the reinforcement layers 124.

In this case, the portions of the reinforcement layers 124 with which the end portions of the glass layer 122 are overlaid penetrate into recessed portions on the surfaces of the glass layer 122 in a spike shape, thus increasing adhesion to the glass layer 122. As a result, the boundaries between the glass layer 122 and the reinforcement layers 124 are secured very tightly, thus further inhibiting the penetration of the solder fillets into the boundaries between the glass layer 122 and the reinforcement layers 124 during mounting.

In this preferred embodiment, the metal layers 123 are provided on the reinforcement layers 124 so as to cover portions of the sintered layers 121 other than portions of the sintered layers 121 that are covered with the glass layer 122 and define and function as other portions of the surfaces of the outer electrode 120a.

As illustrated in FIG. 9, the method for producing the electronic component 100a according to this preferred embodiment includes a step (S100) of preparing the body 110 and a step (S210) of providing the outer electrode 120a on surfaces of the body 110 in such a manner that the outer electrode 120a is electrically connected to the inner electrodes 130.

The step (S210) of providing the outer electrode 120a includes a substep (S111) of providing the sintered layers 121 containing a sintered metal, a substep (S112) of providing the glass layer 122 composed of a material having electrical insulating properties, a substep (S211) of providing the reinforcement layers 124 containing Ni or Cu, and a substep (S113) of providing the metal layers 123 containing at least one of Sn and Cu.

In the substep (S211) of providing the reinforcement layers 124, the reinforcement layers 124 are provided so as to cover portions of the sintered layers 121 other than portions of the sintered layers 121 that are covered with the glass layer 122. In this preferred embodiment, the reinforcement layers 124 are provided by electroplating. Specifically, the reinforcement layers 124 are provided by a barrel plating method. A barrel containing a plurality of the bodies 110 each including the sintered layers 121 and the glass layer 122 is energized while being immersed in a plating solution in a plating tank and being rotated, so that the reinforcement layers 124 are provided on the portions of the sintered layers 121 other than the portions of the sintered layers 121 that are covered with the glass layer 122.

As described above, only a portion of each of the sintered layers 121 on the end surfaces of the body 110, the portion being adjacent to the one main surface 10, is not covered with the glass layer 122. On the side of each of the end surfaces of the body 110, the reinforcement layers 124 cover portions of the sintered layers 121 that are not covered with the glass layer 122, the portions being adjacent to the one main surface 10. Furthermore, the reinforcement layers 124 cover portions of the sintered layers 121 that are not covered with the glass layer 122, the portions being located on the one main surface 10 of the body 110. That is, each of the reinforcement layers 124 extends from the side of a corresponding one of the end surfaces of the body 110 to the side of the one main surface 10.

On the side of each of the side surfaces of the body 110, the reinforcement layers 124 cover portions of the sintered layers 121 that are not covered with the glass layer 122, the portions being adjacent to the one main surface 10. That is, one of the reinforcement layers 124 extends from the side of one of the end surfaces of the body 110 to the side of the one main surface 10 and the side-surface sides of the body 110. The other reinforcement layer 124 extends from the side of the other end surface of the body 110 to the side of the one main surface 10 and the side-surface sides of the body 110.

In the substep (S113) of providing the metal layers 123, the metal layers 123 are provided on the reinforcement layers 124 so as to cover portions of the sintered layers 121 other than portions of the sintered layers 121 that are covered with the glass layer 122 and so as to define and function as other portions of the surfaces of the outer electrode 120a.

In this preferred embodiment, the metal layers 123 are provided preferably by electroplating. Specifically, the metal layers 123 are provided preferably by a barrel plating method. A barrel containing a plurality of the bodies 110 each including the sintered layers 121, the glass layer 122, and the reinforcement layers 124 is energized while being immersed in a plating solution in a plating tank and being rotated, so that the metal layers 123 are provided on the reinforcement layers 124. That is, each of the metal layers 123 extends from the side of a corresponding one of the end surfaces of the body 110 to the side of the one main surface 10. The metal layers 123 are provided on the reinforcement layers 124 on the side of each of the side surfaces of the body 110.

That is, one of the metal layers 123 extends from the side of one of the end surfaces of the body 110 to the side of the one main surface 10 and the side-surface sides of the body 110. The other metal layer 123 extends from the side of the other end surface of the body 110 to the side of the one main surface 10 and the side-surface sides of the body 110.

Also in the electronic component 100a according to this preferred embodiment, the glass layer 122 is provided at least on the side of each of the end surfaces of the body 110, thus inhibiting the wetting and spreading of the solder fillets 30 and inhibiting the formation of a crack in the body 110, the crack being caused by a tensile stress due to the thermal contraction of the solder fillets 30.

An electronic component according to a third preferred embodiment of the present invention and a method for producing the electronic component will be described below. An electronic component 100b according to the third preferred embodiment differs from the electronic component 100a according to the second preferred embodiment only in that the electronic component 100b includes underlying layers. Thus, descriptions of other elements are not redundantly repeated.

Third Preferred Embodiment

Figure 10:
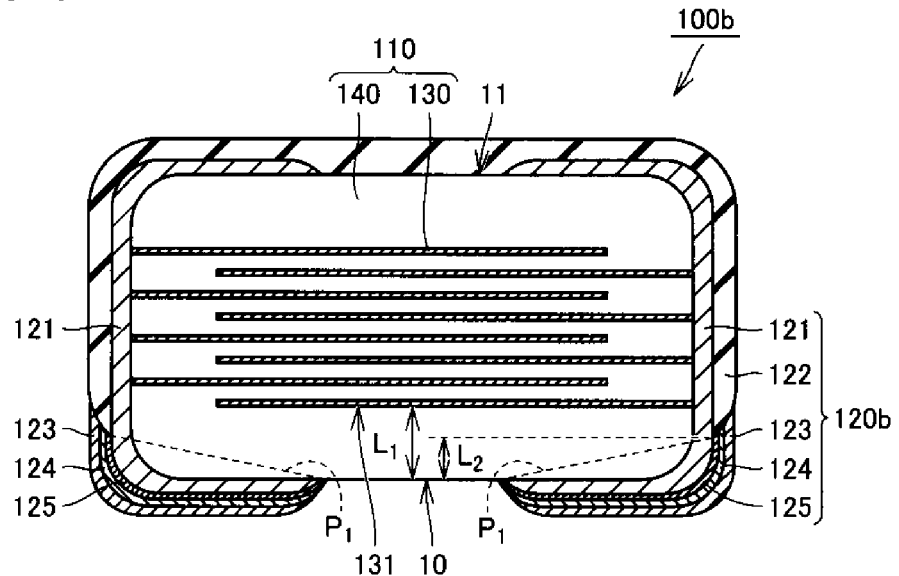
FIG. 10 is a cross-sectional view illustrating the structure of an electronic component according to a third preferred embodiment of the present invention.
Figure 11:
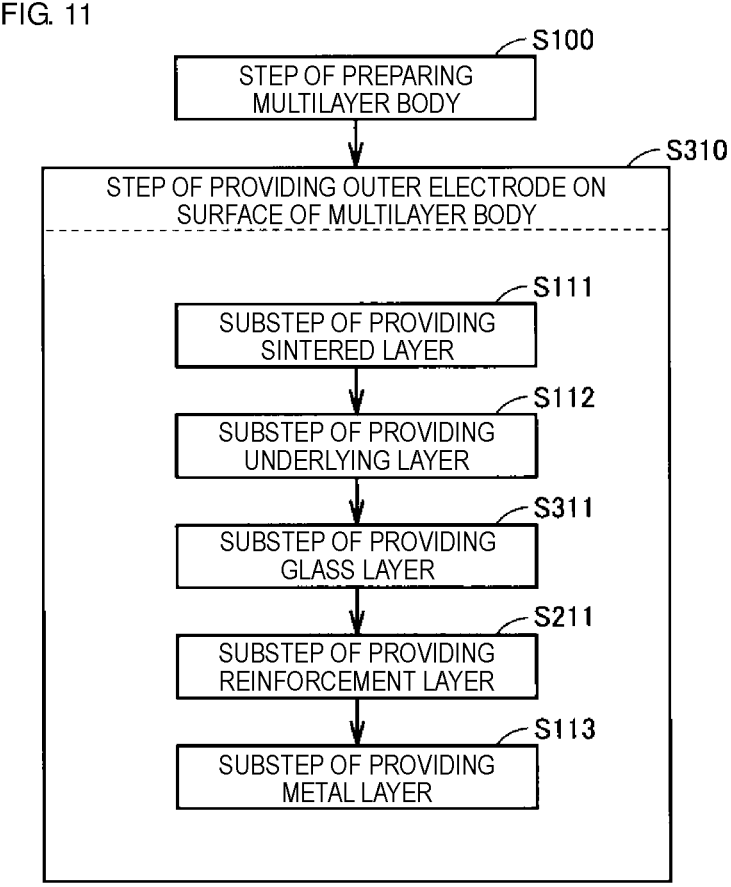
FIG. 11 is a flow chart of a method for producing the electronic component according to the third preferred embodiment of the present invention.

FIG. 10 is a cross-sectional view illustrating the structure of an electronic component according to the third preferred embodiment of the present invention. FIG. 11 is a flow chart of a method for producing the electronic component according to the third preferred embodiment of the present invention. FIG. 10 illustrates a cross section of the electronic component viewed from the same direction as in FIG. 2.

As illustrated in FIG. 10, in the electronic component 100b according to the third preferred embodiment of the present invention, an outer electrode 120b further includes underlying layers 125 composed of a material different from that of each of the reinforcement layers 124, the material containing Cu or Ni. Each of the underlying layers 125 is provided between a corresponding one of the sintered layers 121 and a corresponding one of the reinforcement layers 124.

The underlying layers 125 are provided on the sintered layers 121 so as to cover portions of the sintered layers 121 other than portions of the sintered layers 121 that are covered with the glass layer 122. In this preferred embodiment, each of the underlying layers 125 extends from the side of a corresponding one of the end surfaces of the body 110 to the side of the one main surface 10. As described above, only the portion of each of the sintered layers 121 on the end surfaces of the body 110, the portion being adjacent to the one main surface 10, is not covered with the glass layer 122. On the side of each of the end surfaces of the body 110, the underlying layers 125 cover portions of the sintered layers 121 that are not covered with the glass layer 122, the portions being adjacent to the one main surface 10.

The underlying layers 125 cover portions of the sintered layers 121 that are not covered with the glass layer 122, the portions being located on the one main surface 10 of the body 110. The underlying layers 125 cover portions of the sintered layers 121 located on the side surface of the body 110, the portions of the sintered layers 121 being not covered with the glass layer 122 and being located adjacent to the one main surface 10.

As described above, one of the sintered layers 121 extends from one of the end surfaces of the body 110 to the main surfaces and the side surfaces of the body 110. The other sintered layer 121 extends from the other end surface of the body 110 to the main surfaces and the side surfaces of the body 110.

Thus, one of the underlying layers 125 extends from the side of one of the end surfaces of the body 110 to the side of the one main surface 10 and the side-surface sides of the body 110. The other underlying layer 125 extends from the side of the other end surface of the body 110 to the side of the one main surface 10 and the side-surface sides of the body 110.

The underlying layers 125 may be composed of a material different from a material for the reinforcement layers 124. Specifically, the underlying layers 125 may be composed of Ni, a Ni alloy, Cu, or a Cu alloy. In this preferred embodiment, the underlying layers 125 preferably are composed of Cu, for example.

End portions of the glass layer 122 may be overlaid with the underlying layers 125 by about several micrometers. In this case, the glass layer 122 preferably has higher surface roughness. In a portion of each of the underlying layers 125 with which the end portions of the glass layer 122 are overlaid, the length of the portion of each of the underlying layers 125 in the thickness direction T of the body 110 is preferably larger than the thickness of the underlying layers 125.

In this case, the portions of the underlying layers 125 with which the end portions of the glass layer 122 are overlaid penetrate into recessed portions on the surfaces of the glass layer 122 in a spike shape, thus increasing adhesion to the glass layer 122. As a result, the boundaries between the glass layer 122 and the underlying layers 125 are secured very tightly, thus further inhibiting the penetration of the solder fillets into the boundaries between the glass layer 122 and the underlying layers 125 during mounting.

In this preferred embodiment, the reinforcement layers 124 are provided on the underlying layers 125 so as to cover the whole of each of the underlying layers 125. In this preferred embodiment, the reinforcement layers 124 preferably are composed of Ni, for example.

As illustrated in FIG. 11, the method for producing the electronic component 100b according to this preferred embodiment includes a step (S100) of preparing the body 110 and a step (S310) of providing the outer electrode 120b on surfaces of the body 110 in such a manner that the outer electrode 120b is electrically connected to the inner electrodes 130.

The step (S310) of providing the outer electrode 120b includes a substep (S111) of providing the sintered layers 121 containing a sintered metal, a substep (S112) of providing the glass layer 122 composed of a material having electrical insulating properties, a substep (S311) of providing the underlying layers 125 composed of a material which differs from that of the reinforcement layers 124 and which contains Cu or Ni, a substep (S211) of providing the reinforcement layers 124 containing Ni or Cu, and a substep (S113) of providing the metal layers 123 containing at least one of Sn and Cu.

In the substep (S311) of providing the underlying layers 125, each of the underlying layers 125 is provided between a corresponding one of the sintered layers 121 and a corresponding one of the reinforcement layers 124.

In this preferred embodiment, the underlying layers 125 are provided by electroplating. Specifically, the underlying layers 125 are provided by a barrel plating method. A barrel containing a plurality of the bodies 110 each including the sintered layers 121 and the glass layer 122 is energized while being immersed in a plating solution in a plating tank and being rotated, so that the underlying layers 125 are provided on the portions of the sintered layers 121 other than the portions of the sintered layers 121 that are covered with the glass layer 122.

As described above, only a portion of each of the sintered layers 121 on the end surfaces of the body 110, the portion being adjacent to the one main surface 10, is not covered with the glass layer 122. On the side of each of the end surfaces of the body 110, the underlying layers 125 cover portions of the sintered layers 121 that are not covered with the glass layer 122, the portions being adjacent to the one main surface 10. Furthermore, the underlying layers 125 cover portions of the sintered layers 121 that are not covered with the glass layer 122, the portions being located on the one main surface 10 of the body 110. That is, each of the underlying layers 125 extends from the side of a corresponding one of the end surfaces of the body 110 to the side of the one main surface 10.

On the side of each of the side surfaces of the body 110, the underlying layers 125 cover portions of the sintered layers 121 that are not covered with the glass layer 122, the portions being adjacent to the one main surface 10. That is, one of the underlying layers 125 extends from the side of one of the end surfaces of the body 110 to the side of the one main surface 10 and the side-surface sides of the body 110. The other underlying layer 125 extends from the side of the other end surface of the body 110 to the side of the one main surface 10 and the side-surface sides of the body 110.

In this preferred embodiment, the reinforcement layers 124 are provided by electroplating. Specifically, the reinforcement layers 124 are provided by a barrel plating method. A barrel containing a plurality of the bodies 110 each including the sintered layers 121, the glass layer 122, and the underlying layers 125 is energized while being immersed in a plating solution in a plating tank and being rotated, so that the reinforcement layers 124 are provided on the underlying layers 125.

In the case where the reinforcement layers 124 are provided on the underlying layers 125, the reinforcement layers 124 are easily provided by plating, compared with the case where the reinforcement layers 124 are provided on the sintered layers 121.

Also in the electronic component 100b according to this preferred embodiment, the glass layer 122 is provided at least on the side of each of the end surfaces of the body 110, thus inhibiting the wetting and spreading of the solder fillets 30 and inhibiting the formation of a crack in the body 110, the crack being caused by a tensile stress due to the thermal contraction of the solder fillets 30.

An electronic component according to a fourth preferred embodiment of the present invention will be described below. An electronic component 400 according to the fourth preferred embodiment differs from the electronic component 100a according to the second preferred embodiment only in positions where glass layers, metal layers, and reinforcement layers are provided. Thus, descriptions of other elements are not redundantly repeated.

Fourth Preferred Embodiment

Figure 12:
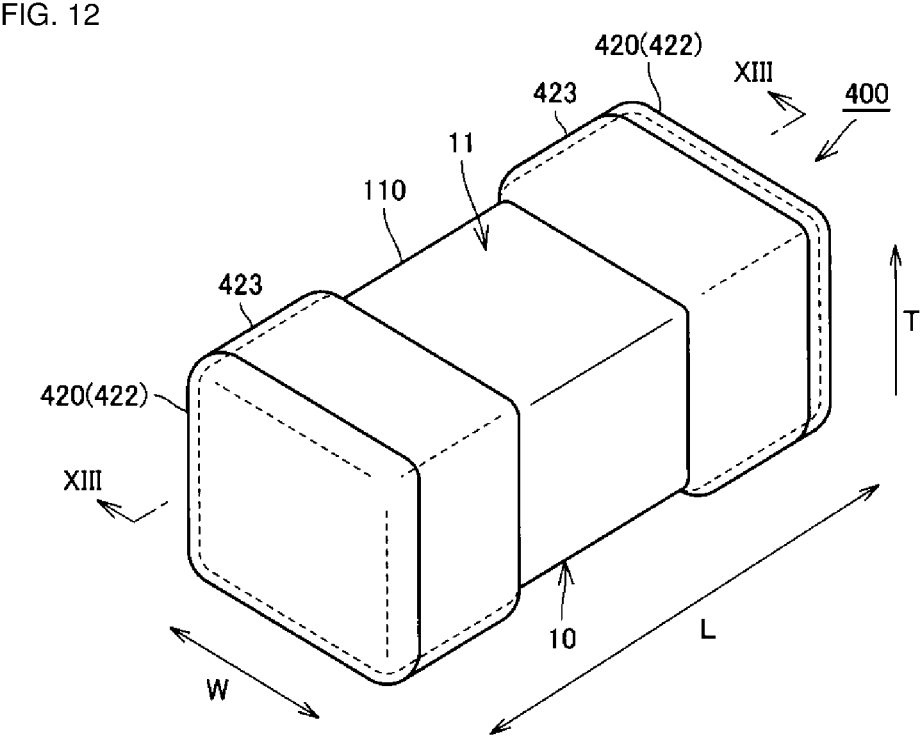
FIG. 12 is a perspective view illustrating the external appearance of an electronic component according to a fourth preferred embodiment of the present invention.
Figure 13:
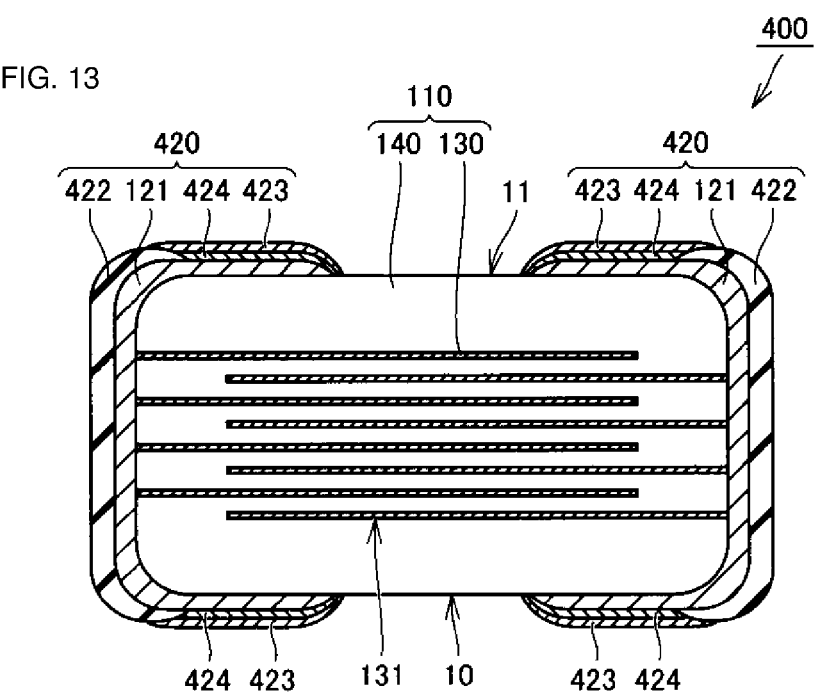
FIG. 13 is a cross-sectional view of the electronic component illustrated in FIG. 12, the view being taken along line XIII-XIII of FIG. 12, and the electric component being viewed in the direction of the arrows.

FIG. 12 is a perspective view illustrating the external appearance of an electronic component according to the fourth preferred embodiment of the present invention. FIG. 13 is a cross-sectional view of the electronic component illustrated in FIG. 12, the view being taken along line XIII-XIII of FIG. 12, and the electric component being viewed in the direction of the arrows.

As illustrated in FIGS. 12 and 13, the electronic component 400 according to the fourth preferred embodiment of the present invention includes the body 110 and outer electrodes 420 provided on surfaces of the body 110, the outer electrodes 420 being electrically connected to the inner electrodes 130. The outer electrodes 420 include the sintered layers 121 containing a sintered metal, glass layers 422 composed of a material with electrical insulating properties, metal layers 423 containing at least one of Sn and Cu, and reinforcement layers 424 containing Ni or Cu. Each of the reinforcement layers 424 is provided between a corresponding one of the sintered layers 121 and a corresponding one of the metal layers 423. The reinforcement layers 424 may not necessarily be provided.

The glass layers 422 are directly provided on portions of the sintered layers 121 located on the end surfaces so as to extend in the width direction W perpendicular or substantially perpendicular to the side surfaces of the body 110 and define and function as portions of surfaces of the outer electrodes 420. In this preferred embodiment, each of the glass layers 422 covers the whole of a corresponding one of the sintered layers 121 on a corresponding one of the end surfaces of the body 110. The glass layers 422 do not cover portions of the sintered layers 121 on the main surfaces and the side surfaces of the body 110.

A non-limiting example of a method for producing the glass layers 422 includes the following steps. The glass paste prepared as described above is applied to a stage with a squeegee having a thickness of, for example, about 30 μm to form a film. End-surface portions of the body 110 including the sintered layers 121 are sequentially dipped in the film, so that the glass paste is attached to the end-surface portions of the body 110. The glass paste attached to the body 110 is dried at, for example, about 150° C. and then baked by heating at about 650° C. with a belt furnace to form the glass layers 422.

The reinforcement layers 424 are provided on the sintered layers 121 so as to cover portions of the sintered layers 121 other than portions of the sintered layers 121 that are covered with the glass layers 422. As described above, the glass layers 422 do not cover portions of the sintered layers 121 on the main-surface sides and the side-surface sides of the body 110. The reinforcement layers 424 cover portions of the sintered layers 121 that are not covered with the glass layers 422 on the main-surface sides and the side-surface sides of the body 110.

The reinforcement layers 424 may be composed of Ni, a Ni alloy, Cu, or a Cu alloy. In this preferred embodiment, the reinforcement layers 424 preferably are composed of Ni, for example.

The metal layers 423 are provided on the reinforcement layers 424 so as to cover portions of the sintered layers 121 other than portions of the sintered layers 121 that are covered with the glass layers 422 and define and function as other portions of surfaces of the outer electrodes 420. In the case where none of the reinforcement layers 424 are provided, the metal layers 423 are provided on the portions of the sintered layers 121 other than the portions of the sintered layers 121 that are covered with the glass layers 422.

In this preferred embodiment, the metal layers 423 cover portions of the sintered layers 121 that are not covered with the glass layers 422 on the end-surface sides and the side-surface sides of the body 110.

In this preferred embodiment, regarding the outer electrodes 420 of the electronic component 400, any of the one main surface 10 and the other main surface 11 of the body 110 may be used as a mounting surface with respect to the substrate 20.

In other words, regarding the outer electrodes 420 of the electronic component 400, also in the case where any of the one main surface 10 and the other main surface 11 of the body 110 is used as a mounting surface, the wetting and spreading of the solder fillets 30 are inhibited, thus inhibiting the formation of a crack in the body 110, the crack being caused by a tensile stress due to the thermal contraction of the solder fillets 30.

Thus, in the electronic component 400 according to this preferred embodiment, the electronic component 400 can be mounted without being limited by the orientation of the electronic component 400 in the thickness direction T of the body 110.

An electronic component according to a fifth preferred embodiment of the present invention will be described below. An electronic component 500 according to the fifth preferred embodiment differs from the electronic component 100 according to the first preferred embodiment only in the lamination direction of the inner electrodes. Thus, descriptions of other elements are not redundantly repeated.

Fifth Preferred Embodiment

Figure 14:
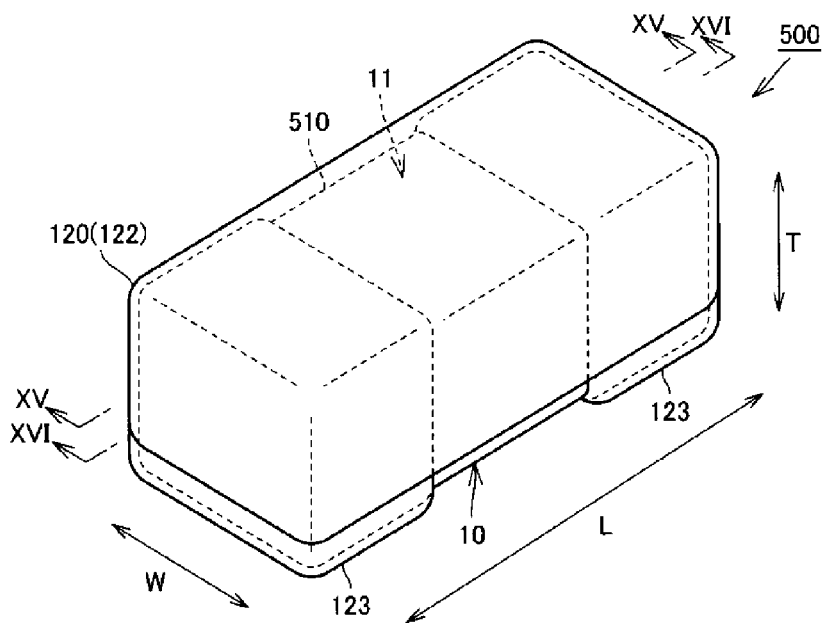
FIG. 14 is a perspective view illustrating the external appearance of an electronic component according to a fifth preferred embodiment of the present invention.
Figure 15:
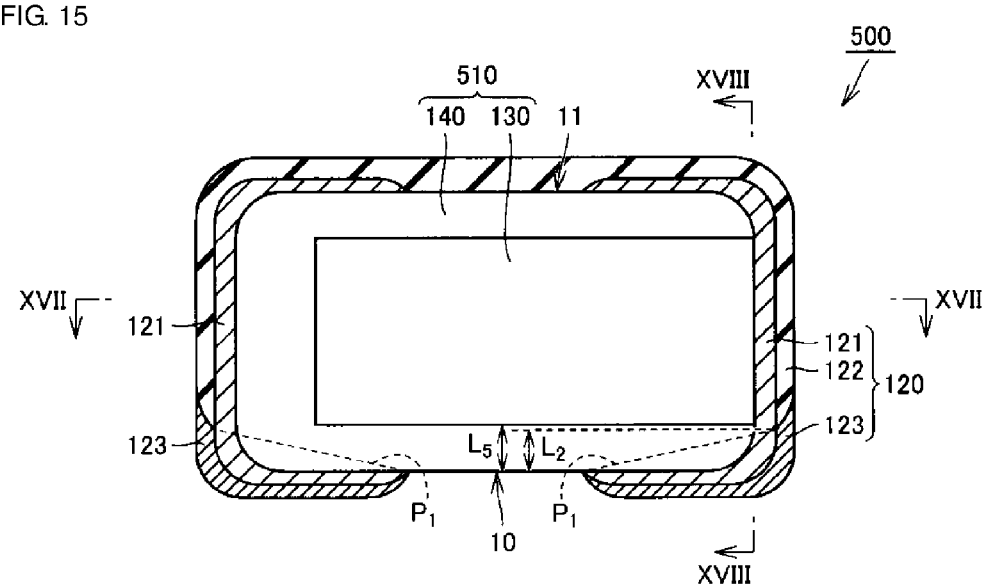
FIG. 15 is a cross-sectional view of the electronic component illustrated in FIG. 14, the view being taken along line XV-XV of FIG. 14, and the electric component being viewed in the direction of the arrows.
Figure 16:
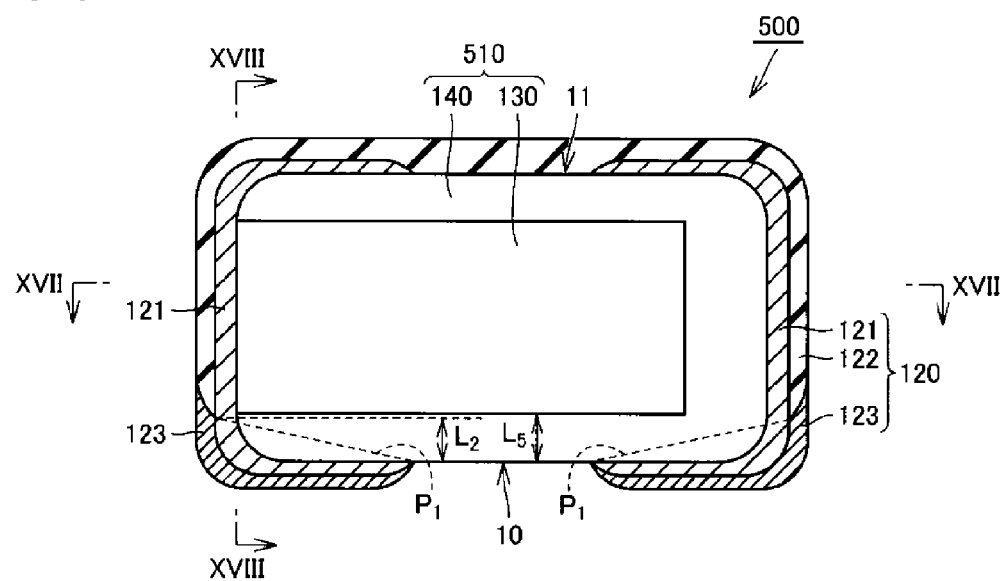
FIG. 16 is a cross-sectional view of the electronic component illustrated in FIG. 14, the view being taken along line XVI-XVI of FIG. 14, and the electric component being viewed in the direction of the arrows.
Figure 17:
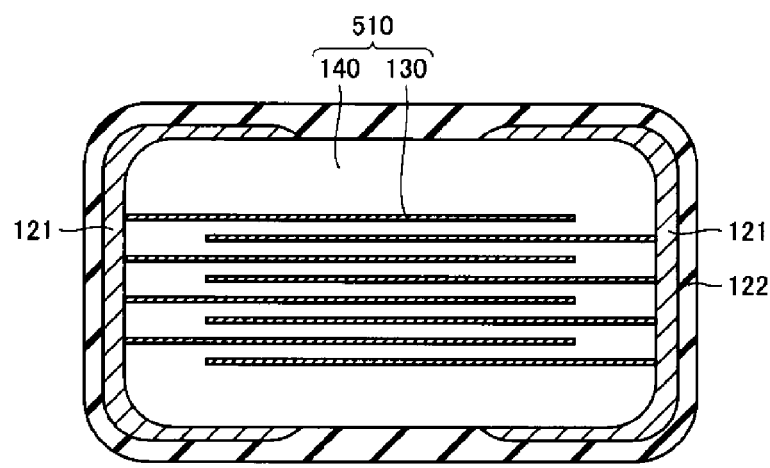
FIG. 17 is a cross-sectional view of the electronic component illustrated in FIGS. 15 and 16, the view being taken along line XVII-XVII of FIGS. 15 and 16, the electric component being viewed in the direction of the arrows.
Figure 18:
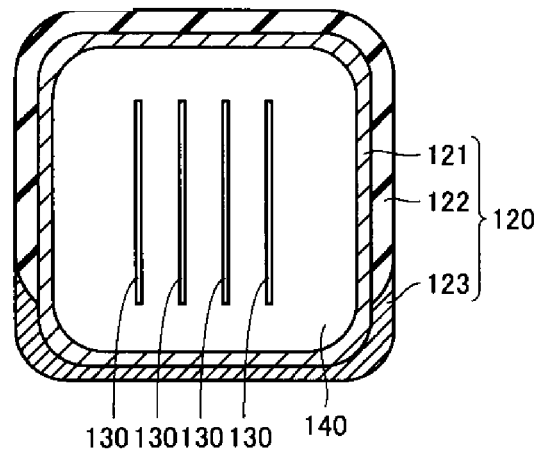
FIG. 18 is a cross-sectional view of the electronic component illustrated in FIGS. 15 and 16, the view being taken along line XVIII-XVIII of FIGS. 15 and 16, and the electric component being viewed in the direction of the arrows.

FIG. 14 is a perspective view illustrating the external appearance of the electronic component according to the fifth preferred embodiment of the present invention. FIG. 15 is a cross-sectional view of the electronic component illustrated in FIG. 14, the view being taken along line XV-XV of FIG. 14, and the electric component being viewed in the direction of the arrows. FIG. 16 is a cross-sectional view of the electronic component illustrated in FIG. 14, the view being taken along line XVI-XVI of FIG. 14, and the electric component being viewed in the direction of the arrows. FIG. 17 is a cross-sectional view of the electronic component illustrated in FIGS. 15 and 16, the view being taken along line XVII-XVII of FIGS. 15 and 16, the electric component being viewed in the direction of the arrows. FIG. 18 is a cross-sectional view of the electronic component illustrated in FIGS. 15 and 16, the view being taken along line XVIII-XVIII of FIGS. 15 and 16, and the electric component being viewed in the direction of the arrows. In FIG. 14, L represents the longitudinal direction of a body described below. W represents the width direction of the body. T represents the thickness direction of the body.

As illustrated in FIGS. 14 to 18, the electronic component 500 according to the fifth preferred embodiment of the present invention includes a substantially rectangular parallelepiped body 510 in which inner electrodes 130 are provided, and the outer electrode 120 provided on surfaces of the body 510, the outer electrode 120 being electrically connected to the inner electrodes 130.

In the body 510, the dielectric layers 140 and the inner electrodes 130 each having a substantially flat-plate shape are alternately laminated. The lamination direction of the dielectric layers 140 and the inner electrodes 130 is perpendicular or substantially perpendicular to the longitudinal direction L and the thickness direction T of the body 510. In other words, the lamination direction of the dielectric layers 140 and the inner electrodes 130 is parallel or substantially parallel to the width direction W of the body 510.

The body 510 includes a pair of main surfaces perpendicular or substantially perpendicular to the thickness direction T, a pair of end surfaces perpendicular or substantially perpendicular to the longitudinal direction L, and a pair of side surfaces perpendicular or substantially perpendicular to the width direction W. The pair of main surfaces includes the one main surface 10 and the other main surface 11. The one main surface 10 is a surface located on the side of a mounting surface of the electronic component 500 at the time of mounting. That is, the one main surface 10 is a surface facing a substrate when the electronic component 500 is mounted on the substrate.

As described above, the body 510 includes the pair of side surfaces perpendicular or substantially perpendicular to the lamination direction of the dielectric layers 140 and the inner electrodes 130, the pair of main surfaces connecting the side surfaces together, and the pair of end surfaces perpendicular or substantially perpendicular to the pair of main surfaces and the pair of side surfaces.

Although the body 510 has a round-cornered substantially rectangular parallelepiped outer shape, the body 510 may not have rounded corners. Any one of the pair of main surfaces, the pair of end surfaces, and the pair of side surfaces may have irregularities.

In adjacent inner electrodes 130 facing each other, a first group of the inner electrodes 130 is electrically connected to the outer electrode 120 on the side of one of the end surfaces of the body 510. A second group of the inner electrodes 130 is electrically connected to the outer electrode 120 on the side of the other end surface of the body 510.

In this preferred embodiment, on the side of each of the end surfaces of the body 510, the glass layer 122 extends across the whole of the body 510 in the width direction W. As illustrated in FIGS. 15 and 16, none of the inner electrodes 130 are located in any of virtual planes $P_1$ each connecting between the position of an edge portion of the glass layer 122 located on the side of a corresponding one of the end surfaces of the body 510, the edge portion of the glass layer 122 being adjacent to the one main surface 10 of the body 510, the position of a corresponding one of the edge portions of the outer electrode 120 located on the one main surface 10 of the body 510 in the shortest length.

In this preferred embodiment, as illustrated in FIGS. 15 and 16, none of the inner electrodes 130 intersect with virtual lines included in the virtual planes $P_1$ in any section of the electronic component 500 parallel or substantially parallel to the side surfaces of the body 510. However, one or more of the inner electrodes 130 may intersect with the virtual lines. Preferably, none of the inner electrodes 130 intersect with any of the virtual lines.

The glass layer 122 is directly provided on portions of the sintered layers 121 located on the end surfaces of the body 510 in such a manner that at least a portion of the glass layer 122 is located between the one main surface 10 of the body 510 and the position of an edge portion of one of the inner electrodes 130, the position being closest to the one main surface 10 of the body 510 in the thickness direction T perpendicular or substantially perpendicular to the main surfaces of the body 510.

Specifically, the relationship $L_2<L_5$ is satisfied, where $L_5$ represents a length between the one main surface 10 of the body 510 and an edge portion of one of the inner electrodes 130, the edge portion being adjacent to the one main surface 10, and $L_2$ represents a length between the one main surface 10 of the body 510 and the position of an end portion of the glass layer 122 located on the side of each end surface of the body 510, the end portion being adjacent to the one main surface 10, and the length represented by $L_2$ being a length in the thickness direction T of the body 510.

In this preferred embodiment, $L_2>0$. That is, only a portion of each of the sintered layers 121 located on both the end surfaces of the body 510, the portion being adjacent to the one main surface 10, is not covered with the glass layer 122. The relationship $L_2 > L_T/10$ is preferred, where $L_T$ represents the thickness of the body 510. Thus, in the electronic component 500, both of the relationships $L_2 < L_5$ and $L_2 > L_T/10$ are preferably satisfied. In this preferred embodiment, the electronic component 500 satisfies the relationship $L_T/10 < L_2 < L_5$.

On the side of each of the side surfaces of the body 510, the glass layer 122 extends in the longitudinal direction L perpendicular or substantially perpendicular to the end surfaces of the body 510. In this preferred embodiment, on the side of each of the side surfaces of the body 510, the glass layer 122 extends across the whole of the body 510 in the longitudinal direction L. That is, portions of the glass layer 122 are directly provided on the sintered layers 121 located on the side surfaces of the body 510. Other portions of the glass layer 122 are directly provided on the side surfaces of the body 510.

Portions of the glass layer 122 located adjacent to the end surfaces of the body 510 and portions of the glass layer 122 located adjacent to the side surfaces of the body 510 are connected together to define a ring shape. On the side of each of the side surfaces of the body 510, the length between the one main surface 10 of the body 510 and the position of an end portion of the glass layer 122 adjacent to the one main surface 10 of the body 510, the length being a length in the thickness direction T of the body 510, is represented by $L_2$.

A portion of the glass layer 122 covers the whole area on the side of the other main surface 11 of the body 510. In other words, a portion of the glass layer 122 is directly provided on portions of the sintered layers 121 located on the other main surface 11 of the body 510. Another portion of the glass layer 122 is directly provided on the other main surface of the body 510. The portion of the glass layer 122 that covers the whole area on the side of the other main surface 11 of the body 510 is connected to portions of the glass layer 122 located adjacent to the end surfaces of the body 510 and portions of the glass layer 122 located adjacent to the side surfaces of the body 510.

As described above, the portions of the glass layer 122 are directly provided on the other main surface 11 of the body 510 and the side surfaces of the body 510. The glass layer 122 has higher adhesion to the body 510 than those of the sintered layers 121. Thus, the direct arrangement of the portions of the glass layer 122 on the body 510 inhibits the peeling of the glass layer 122 during plating treatment or mounting.

In this preferred embodiment, each of the metal layers 123 extends from the side of a corresponding one of the end surfaces of the body 510 to the one main surface 10. As described above, only the portion of each of the sintered layers 121 on the end surfaces of the body 510, the portion being adjacent to the one main surface 10, is not covered with the glass layer 122. On the side of each of the end surfaces of the body 510, the metal layers 123 cover portions of the sintered layers 121 that are not covered with the glass layer 122, the portions being adjacent to the one main surface 10.

The metal layers 123 cover portions of the sintered layers 121 that are not covered with the glass layer 122, the portions being located on the one main surface 10 of the body 510. The metal layers 123 also cover portions of the sintered layers 121 located on the side surface of the body 510, the portions of the sintered layers 121 being not covered with the glass layer 122 and being located adjacent to the one main surface 10.

As described above, one of the sintered layers 121 extends from one of the end surfaces to the main surfaces and the side surfaces of the body 510. The other sintered layer 121 extends from the other end surface to the main surfaces and the side surfaces of the body 510.

Thus, one of the metal layers 123 extends from the side of one of the end surfaces to the side of the one main surface 10 and the side-surface sides of the body 510. The other metal layer 123 extends from the side of the other end surface to the side of the one main surface 10 and the side-surface sides of the body 510.

The one metal layer 123 that extends from the side of one of the end surfaces of the body 510 to the side of the one main surface 10 and the side-surface sides of the body 510 is spaced apart from the other metal layer 123 that extends from the side of the other end surface of the body 510 to the side of the one main surface 10 and the side-surface sides of the body 510, and these metal layers 123 are not electrically connected to each other.

Also in the electronic component 500 according to this preferred embodiment, the glass layer 122 is provided at least on the side of each of the end surfaces of the body 510, thus inhibiting the wetting and spreading of the solder fillets 30 and inhibiting the formation of a crack in the body 510, the crack being caused by a tensile stress due to the thermal contraction of the solder fillets 30.

As described above, none of the inner electrodes 130 are located in any of the virtual planes $P_1$ each connecting between the position of the edge portion of the glass layer 122 located on the side of the corresponding end surface of the body 510, the edge portion of the glass layer 122 being adjacent to the one main surface 10 of the body 510, and the position of the corresponding edge portion of the outer electrode 120 located on the one main surface 10 of the body 510 in the shortest length. If a crack is formed by tensile stress due to the thermal contraction of the solder fillets, the crack is likely to propagate along one of the virtual planes $P_1$. None of the inner electrodes 130 are located in any of the virtual planes $P_1$, so that the breaking of any of the inner electrodes 130 caused by crack formation is inhibited. This inhibits degradation in the electrical characteristics of the electronic component 500 due to the crack formation.

As described above, the relationship $L_T/10 < L_2 < L_5$ is satisfied, where $L_5$ represents a length between the one main surface 10 of the body 510 and an edge portion of one of the inner electrodes 130, the edge portion being adjacent to the one main surface 10, $L_2$ represents a length between the one main surface 10 of the body 510 and the position of an end portion of the glass layer 122 located on the side of each end surface of the body 510, the end portion being adjacent to the one main surface 10, and the length represented by $L_2$ being a length in the thickness direction T of the body 510, and $L_T$ represents the thickness of the body 510.

In the case where the relationship $L_T/10 < L_2$ is satisfied, the solder fillets are appropriately formed to achieve high attitude stability of the electronic component 500 at the time of mounting. Furthermore, the detachment of the mounted electronic component 500 from the substrate due to, for example, impact is inhibited.

The glass layer 122 preferably covers the sintered layers 121 so as to define and function as the outermost layer on the side of each of the side surfaces of the body 510. In this case, when a plurality of the electronic components 500 are mounted in close proximity, even in the case where the side surfaces of adjacent electronic components 500 having insufficient attitude stability are in contact with each other and where the electronic components 500 are mounted with the glass layers 122 in contact with each other, it is possible to prevent the electronic components 500 in contact with each other from being electrically short-circuited.

In the case where the relationship $L_2<L_5$ is satisfied, each of the solder fillets does not overlap with a functional region defined as a region where the inner electrodes 130 are laminated in the body 510. Thus, the tensile stress due to the thermal contraction of the solder fillets is less likely to affect the functional region. As a result, it is possible to inhibit the formation of a crack in the functional region due to the thermal contraction of the solder fillets.

The lamination direction of the inner electrodes 130 in each of the electronic component 100a according to the second preferred embodiment, the electronic component 100b according to the third preferred embodiment, and the electronic component 400 according to the fourth preferred embodiment may be the same as that of the electronic component 500 according to the fifth preferred embodiment.

An electronic component according to a sixth preferred embodiment of the present invention will be described below. An electronic component 600 according to the sixth preferred embodiment differs from the electronic component 100a according to the second preferred embodiment only in positions where sintered layers, glass layers, metal layers, and reinforcement layers are provided. Thus, descriptions of other elements are not redundantly repeated.

Sixth Preferred Embodiment

Figure 19:
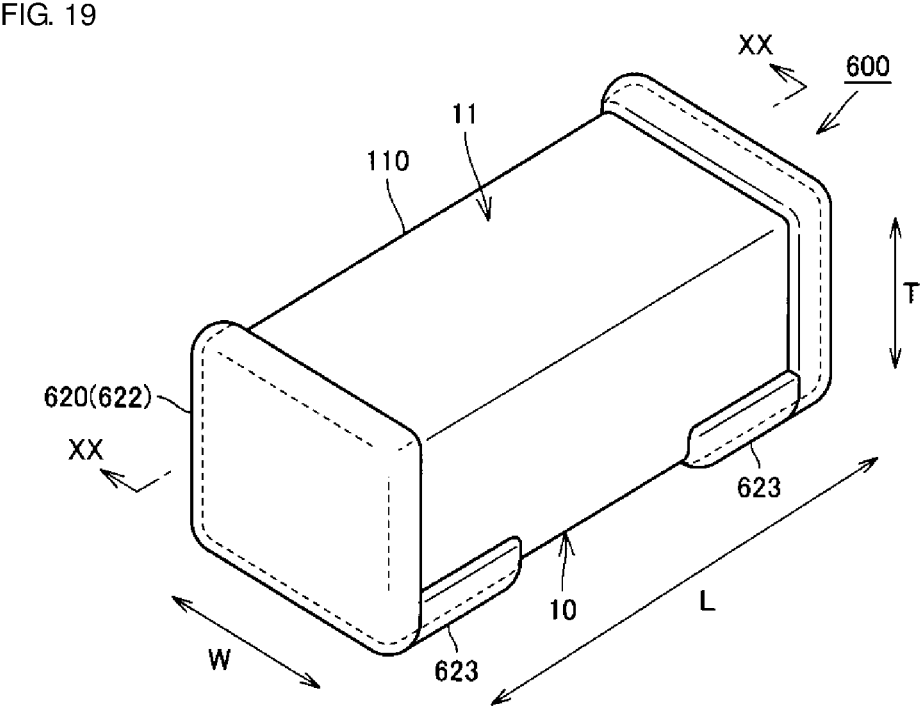
FIG. 19 is a perspective view illustrating the external appearance of an electronic component according to a sixth preferred embodiment of the present invention.
Figure 20:
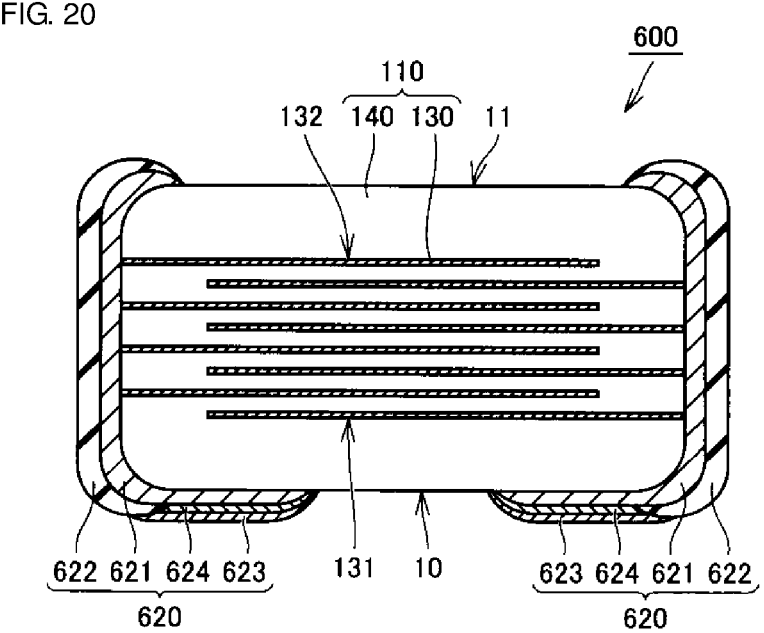
FIG. 20 is a cross-sectional view of the electronic component illustrated in FIG. 19, the view being taken along line XX-XX of FIG. 19, the electronic component being viewed in the direction of the arrows.

FIG. 19 is a perspective view illustrating the external appearance of the electronic component according to the sixth preferred embodiment of the present invention. FIG. 20 is a cross-sectional view of the electronic component illustrated in FIG. 19, the view being taken along line XX-XX of FIG. 19, the electronic component being viewed in the direction of the arrows.

As illustrated in FIGS. 19 and 20, the electronic component 600 according to the sixth preferred embodiment of the present invention includes the body 110 and outer electrodes 620 provided on surfaces of the body 110, the outer electrodes 620 being electrically connected to the inner electrodes 130. The outer electrodes 620 include sintered layers 621 containing a sintered metal, glass layers 622 composed of a material with electrical insulating properties, metal layers 623 containing at least one of Sn and Cu, and reinforcement layers 624 containing Ni or Cu. Each of the reinforcement layers 624 is provided between a corresponding one of the sintered layers 621 and a corresponding one of the metal layers 623. The reinforcement layers 624 may not necessarily be provided.

The sintered layers 621 are provided so as to cover the end surfaces of the body 110, each of the sintered layers 621 extending from a corresponding one of the end surfaces to the one main surface 10. In this preferred embodiment, one of the sintered layers 621 covers the whole of the one end surface of the body 110 and extends from the one end surface to the one main surface 10. The other sintered layer 621 covers the whole of the other end surface of the body 110 and extends from the other end surface to the one main surface 10. None of the sintered layers 621 are provided on the other main surface 11 or each side surface of the body 110. The sintered layer 621 extending from the one end surface of the body 110 to the one main surface 10 and the sintered layer 621 extending from the other end surface of the body 110 to the one main surface 10 are spaced apart from each other and are not electrically connected to each other.

The sintered layers 621 may be composed of a metal, for example, Ni, Cu, Ag, or Pd. The sintered layers 621 may be produced from a conductive paste mainly containing an alloy that contains at least one of the metals. In this preferred embodiment, a conductive paste mainly containing Cu is applied to the surfaces of the body 110 and heated to, for example, about 700° C. to form the sintered layers 621 baked on the body 110.

The glass layers 622 are directly provided on the sintered layers 621 located on the end surfaces so as to extend in the width direction W perpendicular or substantially perpendicular to the side surfaces of the body 110 and define and function as portions of surfaces of the outer electrodes 620. In this preferred embodiment, each of the glass layers 622 covers the whole of a corresponding one of the sintered layers 621 on a corresponding one of the end surfaces of the body 110. The glass layers 622 do not cover portions of the sintered layers 621 on the one main surface 10 of the body 110.

A non-limiting example of a method for producing the glass layers 622 preferably includes the following steps. The glass paste prepared as described above is applied to a stage with a squeegee having a thickness of, for example, about 30 µm to form a film. End-surface portions of the body 110 including the sintered layers 621 are sequentially dipped in the film, so that the glass paste is attached to the end-surface portions of the body 110. The glass paste attached to the body 110 is dried at, for example, about 150° C. and then baked by heating at about 650° C. with a belt furnace to form the glass layers 622.

The reinforcement layers 624 are provided on the sintered layers 621 so as to cover portions of the sintered layers 621 other than portions of the sintered layers 621 that are covered with the glass layers 622. As described above, the glass layers 622 do not cover portions of the sintered layers 621 on the one main surface 10 of the body 110. The reinforcement layers 624 cover portions of the sintered layers 621 that are not covered with the glass layers 622 on the side of the one main surface 10.

The reinforcement layers 624 may be composed of Ni, a Ni alloy, Cu, or a Cu alloy. In this preferred embodiment, the reinforcement layers 624 preferably are composed of Ni, for example.

The metal layers 623 are provided on the reinforcement layers 624 so as to cover portions of the sintered layers 621 other than portions of the sintered layers 621 that are covered with the glass layers 622 and define and function as other portions of surfaces of the outer electrodes 620. In the case where none of the reinforcement layers 624 are provided, the metal layers 623 are provided on the portions of the sintered layers 621 other than the portions of the sintered layers 621 that are covered with the glass layers 622.

In this preferred embodiment, the metal layers 623 cover portions of the sintered layers 621 that are not covered with the glass layers 622 on the side of the one main surface 10 of the body 110.

Also in the electronic component 600 according to this preferred embodiment, the glass layers 622 are provided at least on the side of each of the end surfaces of the body 110, thus inhibiting the wetting and spreading of the solder fillets 30 and inhibiting the formation of a crack in the body 110, the crack being caused by a tensile stress due to the thermal contraction of the solder fillets 30.

In the electronic components according to the first to sixth preferred embodiments of the present invention described above, various structural elements, features and characteristics can be combined together.

Preferred embodiments disclosed herein should be construed as being illustrative but not restrictive in all aspects. The scope of the present invention is shown not by the foregoing preferred embodiments but by claims and it is intended to include all changes which fall within meanings and scopes equivalent to claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a body including inner electrodes, a pair of main surfaces, a pair of side surfaces connecting the main surfaces together, and a pair of end surfaces perpendicular or substantially perpendicular to the pair of main surfaces and the pair of side surfaces; and
   an outer electrode provided on a surface of the body, the outer electrode being electrically connected to the inner electrodes; wherein
   the outer electrode includes:
      sintered layers each containing a sintered metal;
      a glass layer composed of a glass material with electrical insulating properties, the glass material including a Si mole fraction of about 20% by mole or more and about 65% by mole or less; and
      metal layers each containing at least one of Sn and Cu;
   each of the sintered layers covers a corresponding one of the end surfaces and extends from the corresponding end surface to at least one of the main surfaces;
   the glass layer is directly provided on portions of the sintered layers located on the end surfaces such that the glass layer extends in a direction perpendicular or substantially perpendicular to the side surfaces, the glass layer defines a portion of an outermost surface of the outer electrode, and at least a portion of the glass layer is located between one main surface of the pair of main surfaces of the body and a position of an edge portion of one of the inner electrodes closest to the one main surface, the position being closest to the one main surface in a thickness direction perpendicular or substantially perpendicular to the main surfaces;
   a relationship $L_T/10 < L_2 < L_1$ is satisfied, where $L_1$ represents a distance in the thickness direction of the body between the one main surface of the body and the position of the edge portion of the one of the inner electrodes closest to the one main surface, $L_2$ represents a distance in the thickness direction of the body between the one main surface of the body and a position of an edge portion of the glass layer located on a corresponding one of the end surfaces of the body, the edge portion of the glass layer being adjacent to the one main surface, and $L_T$ represents a thickness of the body;
   a portion of the glass layer is provided directly on another main surface of the pair of main surfaces of the body;
   each of the metal layers covers a portion of a corresponding one of the sintered layers other than a portion of the corresponding sintered layer that is covered with the glass layer, each of the metal layers defining another portion of the outermost surface of the outer electrode; and
   the one of the inner electrodes is located closer to the one main surface than to the other main surface.

2. The electronic component according to claim 1, wherein each of the metal layers extends from a corresponding one of the end surfaces to the one main surface.

3. The electronic component according to claim 2, wherein none of the inner electrodes are located in any of virtual planes each connected along a shortest length between the position of the edge portion of the glass layer located on a corresponding one of the end surfaces and a position of an edge portion of the outer electrode located on the one main surface.

4. The electronic component according to claim 1, wherein
   each of the sintered layers further extends from a corresponding one of the end surfaces to the side surfaces; and
   the glass layer is further provided directly on portions of the sintered layers on the side surfaces and extends in a direction perpendicular or substantially perpendicular to the end surfaces.

5. The electronic component according to claim 1, wherein
   the outer electrode further includes reinforcement layers containing Ni or Cu;
   each of the reinforcement layers is provided between a corresponding one of the sintered layers and a corresponding one of the metal layers.

6. The electronic component according to claim 5, wherein
   the outer electrode further includes underlying layers composed of a material including Cu or Ni different from a material of the reinforcement layers;
   each of the underlying layers is provided between a corresponding one of the sintered layers and a corresponding one of the reinforcement layers.

7. The electronic component according to claim 1, wherein the electronic component is one of a capacitor, a thermistor, an inductor and a piezoelectric component.

8. The electronic component according to claim 1, wherein the glass layer extends across an entirety of the body in a width direction of the body.

9. The electronic component according to claim 1, wherein portions of the glass layer located adjacent to the end surfaces of the body and portions of the glass layer located adjacent to the side surfaces of the body are connected together to define a ring shape.

10. A method for producing an electronic component, comprising:
    a step of preparing a body including inner electrodes, a pair of main surfaces, a pair of side surfaces connecting the main surfaces together, and a pair of end surfaces perpendicular or substantially perpendicular to the pair of main surfaces and the pair of side surfaces; and
    a step of providing an outer electrode on a surface of the body in such a manner that the outer electrode is electrically connected to the inner electrodes; wherein
    the step of providing the outer electrode further includes:
       a substep of providing sintered layers each containing a sintered metal;
       a substep of providing a glass layer composed of a glass material with electrical insulating properties, the glass material including a Si mole fraction of about 20% by mole or more and about 65% by mole or less; and
       a substep of providing metal layers each containing at least one of Sn and Cu;

wherein
- in the substep of providing the sintered layers, each of the sintered layers is provided so as to cover a corresponding one of the end surfaces and extend from the corresponding end surface to at least one of the main surfaces;
- in the substep of providing the glass layer, the glass layer is directly provided on portions of the sintered layers located on the end surfaces such that the glass layer extends in a direction perpendicular or substantially perpendicular to the side surfaces and defines a portion of an outermost surface of the outer electrode, at least a portion of the glass layer is located between one main surface of the pair of main surfaces of the body and a position of an edge portion of one of the inner electrodes closest to the one main surface, the position being closest to the one main surface in a thickness direction perpendicular or substantially perpendicular to the main surfaces, a relationship $L_T/10 < L_2 < L_1$ is satisfied, where $L_1$ represents a distance in the thickness direction of the body between the one main surface of the body and the position of the edge portion of the one of the inner electrodes closest to the one main surface, $L_2$ represents a distance in the thickness direction of the body between the one main surface of the body and a position of an edge portion of the glass layer located on a corresponding one of the end surfaces of the body, the edge portion of the glass layer being adjacent to the one main surface, and $L_T$ represents a thickness of the body, and a portion of the glass layer is provided directly on another main surface of the pair of main surfaces of the body;
- in the substep of providing the metal layers, each of the metal layers is provided so as to cover a portion of a corresponding one of the sintered layers other than a portion of the corresponding sintered layer that is covered with the glass layer and so as to define another portion of the outermost surface of the outer electrode; and
- the one of the inner electrodes is located closer to the one main surface than to the other main surface.

11. The method according to claim 10, wherein in the substep of providing the metal layers, each of the metal layers is provided so as to extend from a corresponding one of the end surfaces to the one main surface.

12. The method according to claim 11, wherein in the step of providing the outer electrode, the outer electrode is provided in such a manner that none of the inner electrodes are located in any of virtual planes each connected along a shortest length between the position of the edge portion of the glass layer located on a corresponding one of the end surfaces and a position of an edge portion of the outer electrode located on the one main surface.

13. The method according to claim 10, wherein
- in the substep of providing the sintered layers, each of the sintered layers is provided so as to further extend from a corresponding one of the end surfaces to the side surfaces; and
- in the substep of providing the glass layer, the glass layer is further provided directly on portions of the sintered layers on the side surfaces so as to extend in a direction perpendicular or substantially perpendicular to the end surfaces.

14. The method according to claim 10, wherein
- the step of providing the outer electrode further includes a substep of providing reinforcement layers containing Ni or Cu;
- in the substep of providing the reinforcement layers, each of the reinforcement layers is provided between a corresponding one of the sintered layers and a corresponding one of the metal layers.

15. The method according to claim 14, wherein
- the step of providing the outer electrode further includes a substep of providing underlying layers composed of a material including Cu or Ni different from a material of the reinforcement layers;
- in the substep of providing the underlying layers, each of the underlying layers is provided between a corresponding one of the sintered layers and a corresponding one of the reinforcement layers.

16. The method according to claim 10, wherein in the substep of providing the sintered layers, dielectric layers contained in the body is co-fired with the sintered layers.

17. The method according to claim 10, wherein the electronic component is one of a capacitor, a thermistor, an inductor and a piezoelectric component.

18. The method according to claim 10, wherein the glass layer is formed to extend across an entirety of the body in a width direction of the body.

* * * * *